(12) United States Patent
Do

(10) Patent No.: US 11,063,033 B2
(45) Date of Patent: Jul. 13, 2021

(54) INTEGRATED CIRCUITS INCLUDING STANDARD CELLS AND METHOD OF MANUFACTURING THE INTEGRATED CIRCUITS

(71) Applicant: Samsung Electronics Co., Ltd., Suwon-si (KR)

(72) Inventor: Jung-Ho Do, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/010,128

(22) Filed: Sep. 2, 2020

(65) Prior Publication Data

US 2020/0402969 A1 Dec. 24, 2020

Related U.S. Application Data

(63) Continuation of application No. 16/203,845, filed on Nov. 29, 2018, now Pat. No. 10,790,273.

(30) Foreign Application Priority Data

Dec. 7, 2017 (KR) .................. 10-2017-0167500
Mar. 20, 2018 (KR) .................. 10-2018-0032343

(51) Int. Cl.
*H01L 27/02* (2006.01)
*H01L 27/118* (2006.01)
(Continued)

(52) U.S. Cl.
CPC ........ *H01L 27/0207* (2013.01); *G06F 30/392* (2020.01); *G06F 30/394* (2020.01);
(Continued)

(58) Field of Classification Search
CPC .......... H01L 27/0207; H01L 27/11807; H01L 2027/11875; H01L 2027/11881; G06F 30/392; G06F 30/394
See application file for complete search history.

(56) References Cited

U.S. PATENT DOCUMENTS 5,987,086 A 11/1999 Raman et al.
6,838,713 B1 1/2005 Gheewala et al.
(Continued)

OTHER PUBLICATIONS

Non-Final Office Action dated Feb. 20, 2020 in U.S. Appl. No. 16/203,845.
(Continued)

*Primary Examiner* — Sitaramarao S Yechuri
(74) *Attorney, Agent, or Firm* — Harness, Dickey & Pierce, P.L.C.

(57) ABSTRACT

Provided are integrated circuits including a plurality of standard cells aligned along a plurality of rows. The integrated circuit includes first standard cells aligned on the first row and including first conductive patterns to which a first supply voltage is applied in a conductive layer and second standard cells aligned on the second row which is adjacent to the first row in the conductive layer and including second conductive patterns to which the first supply voltage is applied in the conductive layer. A pitch between the first conductive patterns and the second conductive patterns may be less than a pitch provided by single-patterning.

20 Claims, 19 Drawing Sheets

(51) Int. Cl.
*G06F 30/392* (2020.01)
*G06F 30/394* (2020.01)

(52) U.S. Cl.
CPC ............... *H01L 27/11807* (2013.01); *H01L 2027/11875* (2013.01); *H01L 2027/11881* (2013.01)

(56) References Cited

U.S. PATENT DOCUMENTS

| | | | |
|---|---|---|---|
| 6,925,627 | B1 | 8/2005 | Longway et al. |
| 7,919,792 | B2 | 4/2011 | Law et al. |
| 8,410,526 | B2 | 4/2013 | Shimizu |
| 8,513,978 | B2 | 8/2013 | Sherlekar |
| 8,756,550 | B2 | 6/2014 | Blatchford |
| 9,818,694 | B2 | 11/2017 | Lin et al. |
| 2005/0281098 | A1 | 12/2005 | Sadra et al. |
| 2007/0033548 | A1* | 2/2007 | Tatsumi ............ H01L 27/11898 257/371 |
| 2012/0282753 | A1 | 11/2012 | Kim |
| 2013/0026572 | A1* | 1/2013 | Kawa .................... G06F 30/392 257/347 |
| 2013/0074029 | A1* | 3/2013 | Blatchford .......... H01L 27/0207 716/127 |
| 2013/0105936 | A1 | 5/2013 | Ikegami et al. |
| 2014/0167117 | A1 | 6/2014 | Quandt et al. |
| 2014/0197543 | A1 | 7/2014 | Kornachuk et al. |
| 2016/0085898 | A1* | 3/2016 | Manohar ............... G06F 30/398 716/124 |
| 2016/0300840 | A1 | 10/2016 | Seo et al. |
| 2017/0235865 | A1 | 8/2017 | Preuthen et al. |
| 2017/0243888 | A1 | 8/2017 | Shimbo |
| 2017/0294448 | A1 | 10/2017 | Debacker et al. |

OTHER PUBLICATIONS

Notice of Allowance dated May 21, 2020 in U.S. Appl. No. 16/203,845.

* cited by examiner

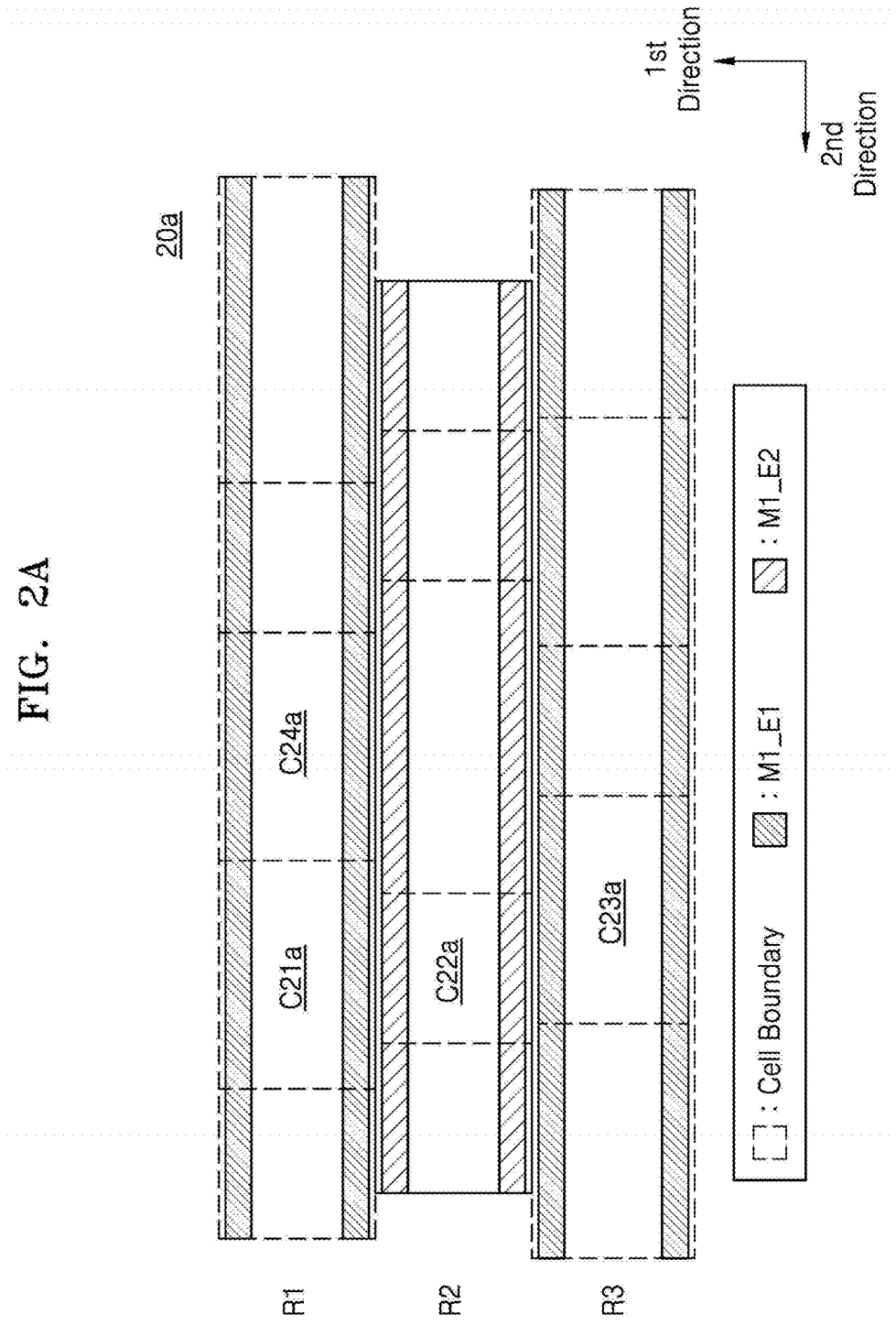

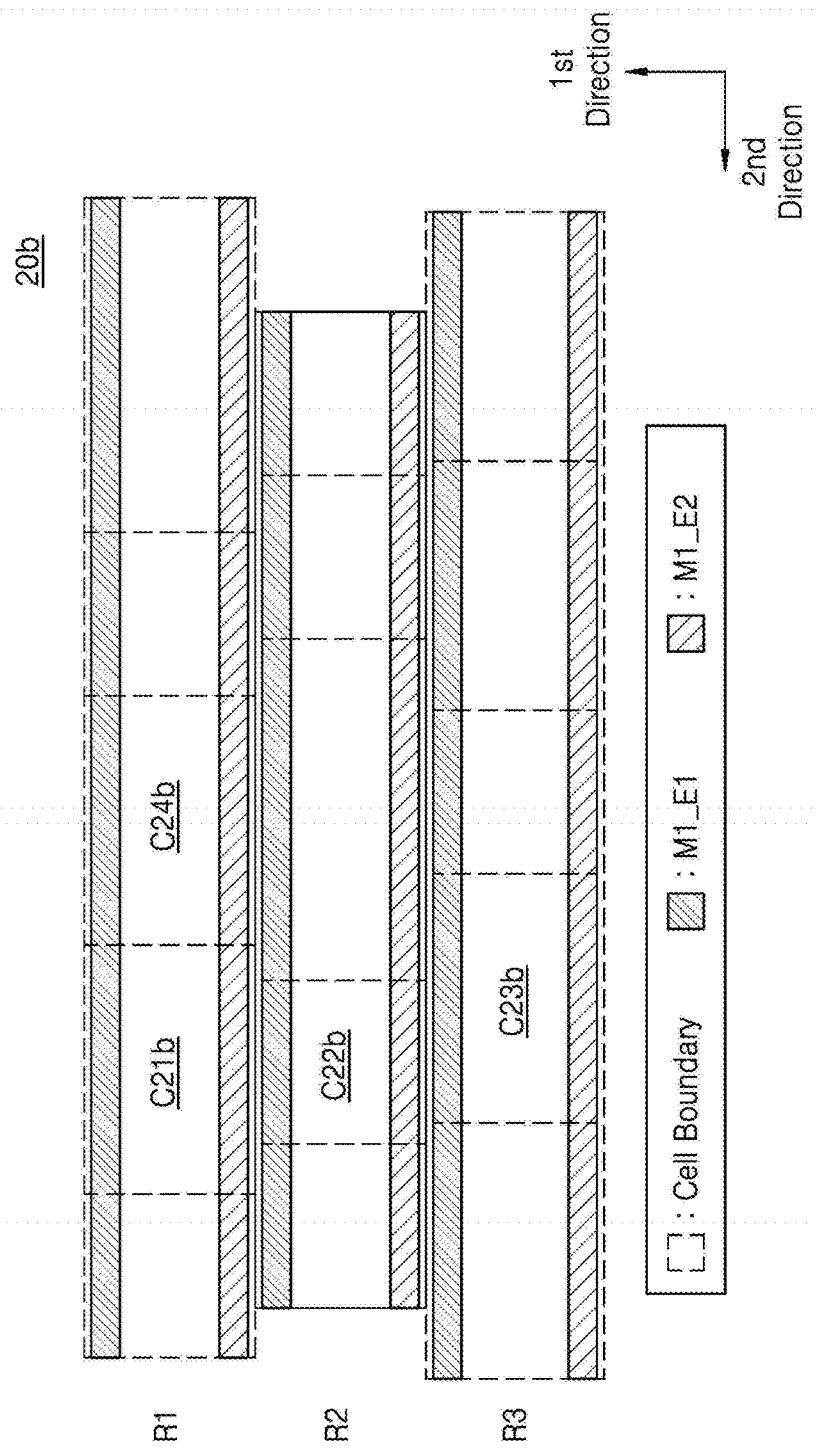

INTEGRATED CIRCUITS INCLUDING STANDARD CELLS AND METHOD OF MANUFACTURING THE INTEGRATED CIRCUITS

CROSS-REFERENCE TO RELATED APPLICATIONS

This application is a Continuation of U.S. application Ser. No. 16/203,845, filed on Nov. 29, 2018, which claims the benefit of Korean Patent Application Nos. 10-2017-0167500, filed on Dec. 7, 2017 and 10-2018-0032343, filed on Mar. 20, 2018, in the Korean Intellectual Property Office, the disclosures of which are incorporated herein in their entirety by reference.

BACKGROUND

The inventive concepts relate to integrated circuits, and more particularly, to integrated circuits including standard cells and a method of manufacturing the integrated circuits.

As semiconductor processes are miniaturized, sizes of standard cells included in an integrated circuit may also be reduced. A design rule may define requirements of a layout of the integrated circuit, and the standard cells may include a margin to satisfy the design rule with surrounding structures when the standard cells are placed. The margin included in the standard cells may limit the reduction in the sizes of the standard cells, and as a result, may limit the increase in the degree of integration.

SUMMARY

The inventive concepts relate to integrated circuits including standard cells, and more particularly, standard cells that comply with a design rule and have high space efficiency, integrated circuits including the standard cells, and a method of manufacturing the integrated circuits.

According to an aspect of the inventive concepts, there is provided an integrated circuit including a plurality of standard cells aligned along a plurality of rows, the integrated circuit includes: first standard cells aligned on a first row in a conductive layer and including first conductive patterns to which a first supply voltage is applied; and second standard cells aligned on a second row in the conductive layer and including second conductive patterns to which a first supply voltage is applied, and a pitch between the first conductive patterns and the second conductive patterns is less than a pitch provided by single-patterning.

According to an aspect of the inventive concepts, there is provided an integrated circuit including: a first standard cell and a second standard cell adjacent to each other in a first horizontal direction; and a first power line extending in a second horizontal direction that crosses the first horizontal direction to supply power to the first standard cell and the second standard cell, wherein the first standard cell and the second standard cell respectively include a first conductive pattern and a second conductive pattern that are electrically connected to the first power line and are disposed adjacent to a first boundary between the first standard cell and the second standard cell, and a pitch between the first conductive pattern and the second conductive pattern is less than a pitch provided by single-patterning.

According to an aspect of the inventive concepts, there is provided a method of manufacturing an integrated circuit including a plurality of standard cells aligned along a plurality of rows, the method includes: patterning a conductive layer by using a first mask; and patterning the conductive layer by using a second mask, wherein the patterning of the conductive layer by using the first mask includes patterning first conductive patterns that are included in standard cells of a first row and to which a first supply voltage is applied, the patterning of the conductive layer by using the second mask includes patterning second conductive patterns that are included in standard cells of a second row that is adjacent to the first row and to which the first supply voltage is applied, and a pitch between the first conductive patterns and the second conductive patterns is less than a pitch provided by single-patterning.

According to an aspect of the inventive concepts, there is provided a method of manufacturing an integrated circuit, the method includes placing and routing a plurality of standard cells based on input data that define a cell library and the integrated circuit, wherein the placing and routing include: placing first standard cells to which a first supply voltage is applied, that are patterned by a first mask in a conductive layer, and comprise first conductive patterns in odd-number rows or even-number rows; and placing second standard cells to which the first supply voltage is applied, that are patterned by a second mask in the conductive layer, and include second conductive patterns in odd-number rows or even-number rows.

BRIEF DESCRIPTION OF THE DRAWINGS

For convenience of understanding the accompanying drawings included in the specification, constituent elements may not match to scales and may be exaggerated or reduced. Embodiments of the inventive concepts will be more clearly understood from the following detailed description taken in conjunction with the accompanying drawings in which:

FIGS. 2A and 2B are diagrams of integrated circuits according to example embodiments of the inventive concepts;

DETAILED DESCRIPTION OF EXAMPLE EMBODIMENTS

Figure 1A:
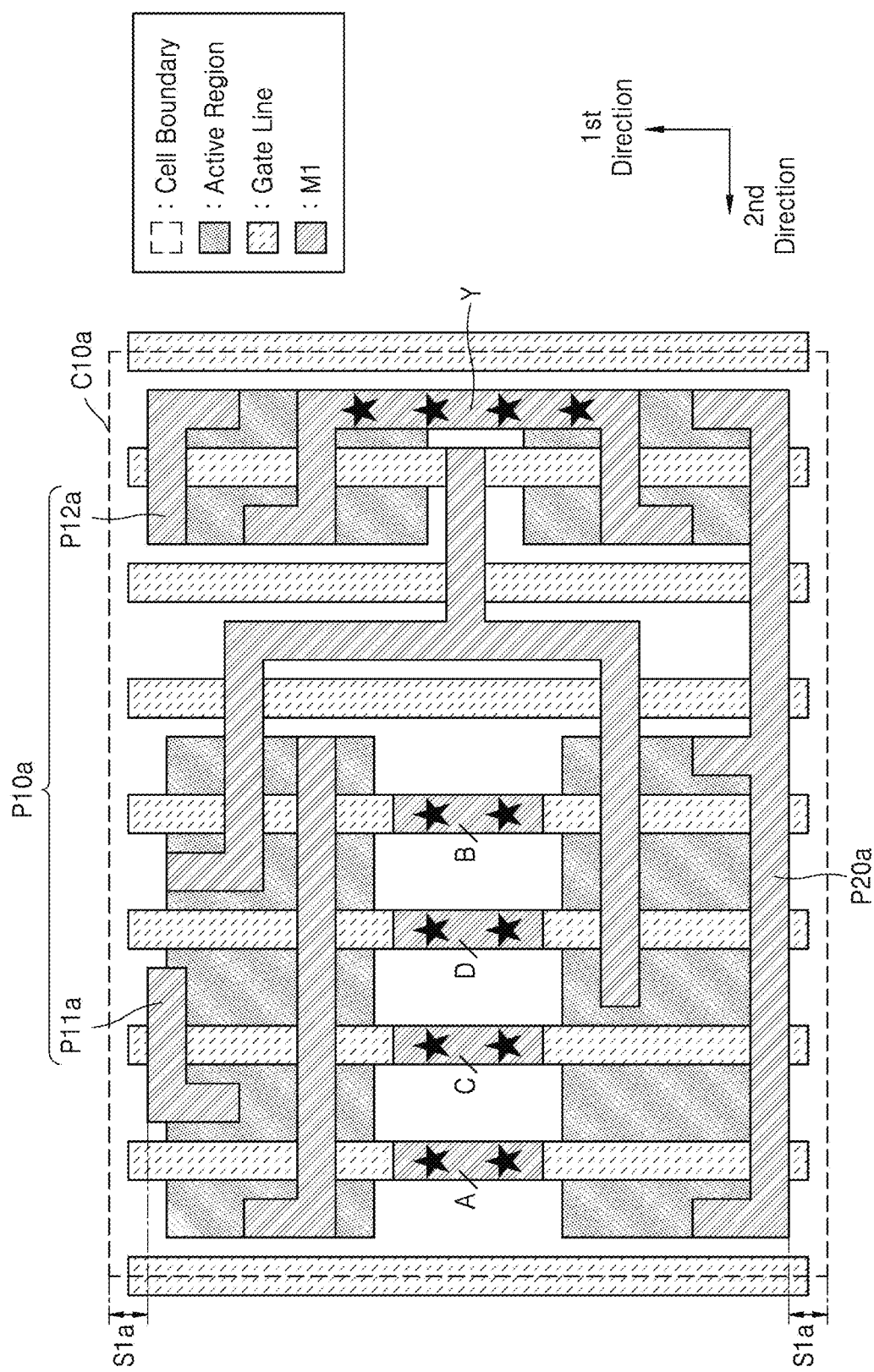
FIGS. 1A and 1B are drawings of standard cells having different layouts but providing the same function.
Figure 1B:
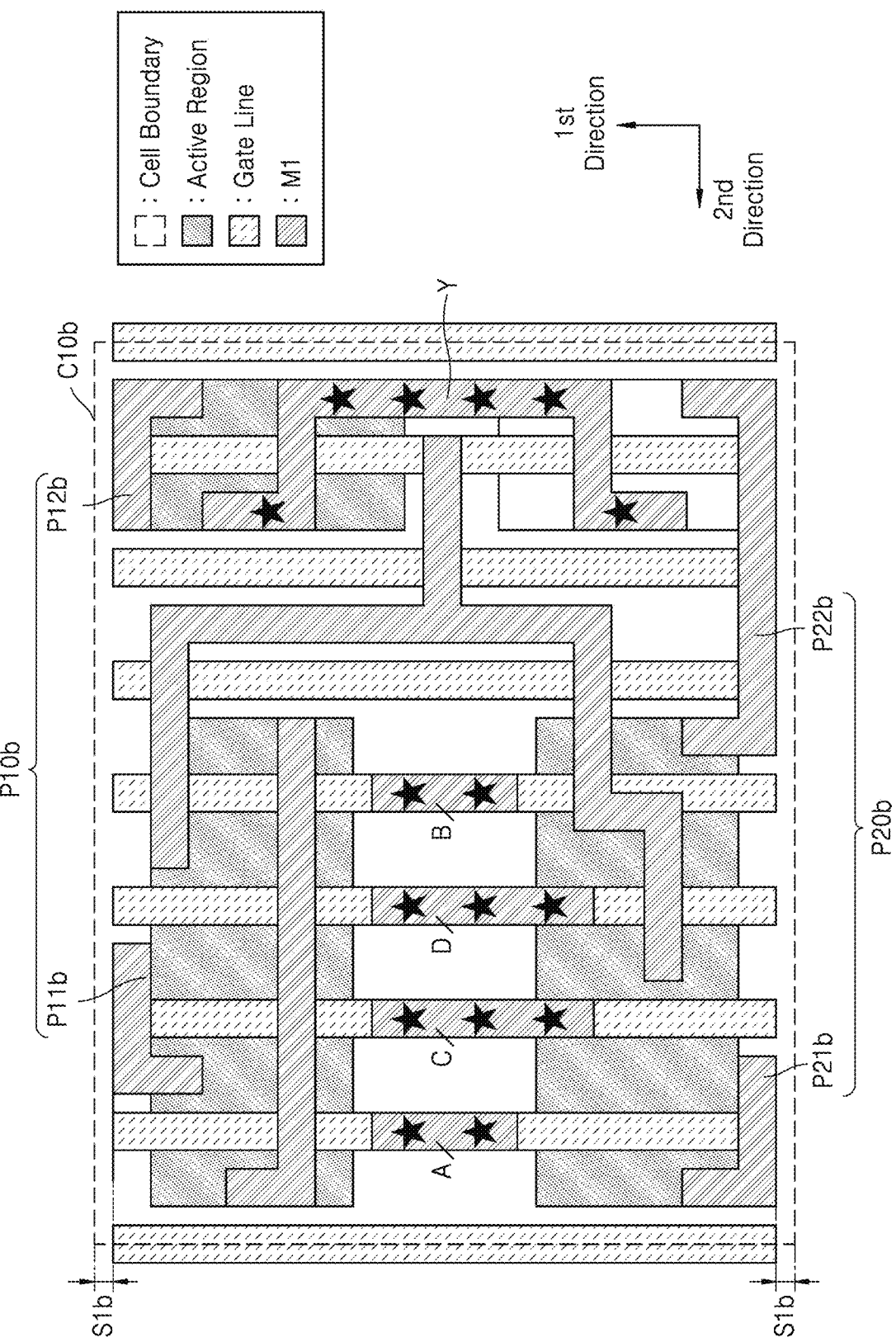

FIGS. 1A and 1B are drawings of standard cells that provide the same function but have different layouts. In detail, first standard cells C10a and C10b of FIGS. 1A and 1B show AO122 cells having input pins A, B, C, and D and an output pin Y. In the present specification, a first direction and a second direction may be referred to as a first horizontal direction and a second horizontal direction, respectively, and a plane formed in the first and second directions may be referred to as a horizontal plane. Also, an area may refer to an area on the horizontal plane, and a direction perpendicular to the horizontal plane may be referred to as a vertical direction. In describing the standard cells of FIGS. 1A and 1B, repeated descriptions may be omitted.

A standard cell is a unit of a layout included in an integrated circuit, and the integrated circuit may include a plurality of standard cells. The standard cells may have a structure that complies with a rule set in advance, for example, as depicted in FIGS. 1A and 1B, a certain height (that is, a length in the first direction). Also, the standard cell may include at least one gate line extending in the first direction and at least one active region extending in the second direction, and the gate line and the active region may form a transistor. Although not shown in FIGS. 1A and 1B, the standard cell may include at least one fin extending in the second direction on the active region, and the fin may form a fin field effect transistor (FinFET) together with the gate line. The active region and the gate line may be electrically connected to a conductive pattern of a conductive layer (for example, an M1 layer) through a contact and/or a via. In some embodiments, the active region may include a semiconductor, such as Si or Ge, or a compound semiconductor, such as SiGe, SiC, GaAs, InAs, or InP, and may include a conductive region, for example, a well doped with a dopant or a structure doped with a dopant. The gate line may include a layer containing a work function metal and a gap-fill metal film. For example, the layer containing a work function metal may include at least one metal selected from the group consisting of Ti, W, Ru, Nb, Mo, Hf, Ni, Co, Pt, Yb, Tb, Dy, Er, and Pd and combinations thereof, and the gap-fill metal film may include a W film or an Al film. In some embodiments, the gate line may include a stacking structure of TiAlC/TiN/W, a stacking structure of TiN/TaN/TiAlC/TiN/W, or a stacking structure of TiN/TaN/TiN/TiAlC/TiN/W.

Referring to FIG. 1A, the first standard cell C10a may include the input pins A, B, C, and D, the output pin Y, and power taps P10a and P20a. The integrated circuit may include mutual connections that include conductive patterns of vias and/or conductive layers (for example, an M1 layer and an M2 layer). The input pins A, B, C, and D of the first standard cell C10a may be electrically connected to an output pin of other standard cells through the mutual connections, and the output pin Y of the first standard cell C10a may also be connected to input pins of other standard cell through the mutual connections.

As depicted in FIG. 1A, the M1 layer may include patterns for the input pins A, B, C, and D and the output pin Y, and also may include patterns for internal signals of the first standard cell C10a. The M1 layer is a conductive layer, for example, a metal layer, and patterns formed in the M1 layer may be electrically connected to the active layer or the gate line through contacts and/or vias. In some embodiments, the patterns of the M1 layer may be formed by double-patterning or multi-patterning, and the multi-patterning may provide a reduced pitch between the patterns that is less than a pitch provided by single-patterning. For example, the patterns of the M1 layer may be patterned by using at least two masks according to the multi-patterning, and accordingly, the patterns may have a pitch that is less than a pitch of single-patterning. For example, the pitch provided by the single patterning may have a size in a range from about 80 nm to about 100 nm, and the pitch provided by different masks in the multi-patterning may have a size in a range from about 40 nm to about 70 nm. In the multi-patterning, the correspondence of the patterns to a single mask so that the patterns are patterned by one of a plurality of masks may be referred to as coloring of a pattern.

In FIG. 1A, as depicted by "★", the first standard cell C10a may provide candidate points of the input pins A, B, C, and D and the output pin Y for disposing vias that electrically connect conductive patterns of the M2 layer to the input pins A, B, C, and D and the output pin Y. For example, the conductive patterns of the M2 layer may extend parallel to each other in the second direction, and the first standard cell C10a may provide candidate points for disposing vias for electrically connecting the conductive patterns of the M2 layer to the input pins A, B, C, and D and the output pin Y on points on the input pins A, B, C, and D and the output pin Y overlapping the conductive patterns of the M2 layer in a vertical direction.

In the case when the number of candidate points provided by the input pins A, B, C, and D and the output pin Y is relatively large, the degree of freedom of mutual connections is increased. However, in the case when the number of candidate points is relatively small, a routing congestion may occur. For example, as depicted in FIG. 1A, when the input pins A, B, C, and D adjacent in the second direction respectively provide two candidate points, it may not be easy to route the input pins A, B, C, and D to the conductive patterns of the M2 layer. Accordingly, the first standard cell C10a may be extended in the first direction so that the input pins A, B, C, and D provide a further larger number of candidate points, and thus, the first standard cell C10a may require a further larger area than the area depicted in FIG. 1A.

In order to supply power to the first standard cell C10a, the first standard cell C10a may include first and second power taps P10a and P20a to which a power voltage is applied. In some embodiments, the first and second power taps P10a and P20a may be formed on the conductive layer (for example, the M1 layer) and may be referred to as a conductive pattern to which a power voltage is applied. For example, the first standard cell C10a may include the first power tap P10a to which a positive supply voltage is applied and the second power tap P20a to which a negative supply voltage is applied. The first power tap P10a may include first conductive patterns P11a and P12a, and the second power tap P20a may be referred to as a second conductive pattern. The integrated circuit may include power rails that vertically overlap boundaries of the first standard cell C10a facing each other in the first direction, and the first and second power taps P10a and P20a of the first standard cell C10a may be electrically connected to the power rails. For example, the power rails may include conductive patterns of the M2 layer, the conductive patterns extend parallel to each other in the second direction and provide a positive supply voltage or a negative supply voltage to the first power taps P10a and P10b and the second power taps P20a and P20b of the first standard cells C10a and C10b, and the conductive patterns of the M2 layer may be referred to as power lines. In some embodiments, the power lines that provide a positive supply voltage and the power lines that provide a negative supply voltage may be alternately disposed.

As depicted in FIG. 1A, the first and second power taps P10a and P20a may be separated by a certain distance S1a from boundaries of the first standard cell C10a facing each other in the first direction. For example, the design rule may define a minimum distance between the adjacent conductive patterns on the M1 layer, and the first and second power taps P10a and P20a may be separated by the certain distance S1a from the boundaries of the first standard cell C10a facing each other in the first direction considering locations of power taps of the M1 layer included in another standard cell that is adjacent to the first standard cell C10a in the first direction. For example, the distance S1a of FIG. 1A may match up with a half of a minimum distance between patterns provided by single patterning.

Referring to FIG. 1B, the first standard cell C10b, similar to the first standard cell C10a of FIG. 1A, may include the input pins A, B, C, and D, the output pin Y, and first and second power taps P10b and P20b. When the first standard cell C10b is compared with the first standard cell C10a of FIG. 1A, the first standard cell C10b of FIG. 1B may include first and second power taps P10b and P20b disposed further adjacently to boundaries of the first standard cell C10b. For example, as depicted in FIG. 1B, the first power tap P10b to which a positive supply voltage is applied and the second power tap P20b to which a negative supply voltage is applied respectively may be separated by a distance S1b from boundaries of the first standard cell C10b. The distance S1b may be less than the distance S1a. For this, first conductive patterns P11b and P12b included in the first power tap P10b and second conductive patterns P21b and P22b included in the second power tap P20b may be patterned by using a mask different from a mask of power taps of a standard cell adjacent to the first standard cell C10b. For example, the distance S1b of FIG. 1B may match up a half of a minimum distance between patterns patterned by using a different mask in multi-patterning.

In the first standard cell C10b, since the first and second power taps P10b and P20b are disposed further adjacently to the boundaries of the first standard cell C10b, a greater area for patterning the M1 layer in the first standard cell C10b is ensured than in the first standard cell C10a of FIG. 1A. Accordingly, as indicated by "*" in FIG. 1B, the first standard cell C10b of FIG. 1B may provide a greater number of candidate points than in the first standard cell C10a of FIG. 1A. For example, the two input pins C and D of the four input pins A, B, C, and D respectively may have three candidate points, and the output pin Y may have six candidate points. Accordingly, the first standard cell C10b of FIG. 1B may solve the problem of routing congestion without extending in the first direction.

FIGS. 2A and 2B are drawings of integrated circuits according to example embodiments of the inventive concepts. In detail, FIGS. 2A and 2B show conductive patterns of a power tap as a component of integrated circuits 20a and 20b that include a plurality of standard cells. As described above with reference to FIGS. 1A and 1B, standard cells of the integrated circuits 20a and 20b may include power taps corresponding to a mask which is different from a mask corresponding power taps of another adjacent standard cell, and accordingly, the integrated circuits 20a and 20b may have a small area for routing without causing a routing congestion. Hereinafter, when the integrated circuits 20a and 20b are described with respect to FIGS. 2A and 2B, overlapping content will not be repeated.

Referring to FIG. 2A, in the integrated circuit 20a, a plurality of standard cells may be aligned along a plurality of rows R1, R2, and R3 extending parallel to each other in a second direction. In some embodiments, as depicted in FIG. 2A, power taps of the standard cells included in an odd-number row may include conductive patterns M1_E1 patterned by a first mask in the M1 layer, and power taps of the standard cells in an even-number row may include conductive patterns M1_E2 patterned by a second mask in the M1 layer. For example, a first standard cell C21a and a fourth standard cell C24a of the first row R1 and a third standard cell C23a of the third row R3 may include the conductive patterns M1_E1 patterned by the first mask as power taps, and a second standard cell C22a of the second row R2 may include the conductive patterns M1_E2 patterned by the second mask as power taps. Accordingly, pitches of conductive patterns of the power taps included in the standard cells adjacent in the first direction may be less than a pitch provided by single-patterning, and an area for routing the M1 layer may be increased in each of the standard cells. In some embodiments, unlike in FIG. 2A, the power taps of the standard cells included in the odd-number row may include the conductive patterns M1_E2 patterned by the second mask in the M1 layer, and the power taps of the standard cells included in the even number row may include the conductive patterns M1_E1 patterned by the first mask in the M1 layer.

In some embodiments, the power taps of the standard cells adjacent to each other in the first direction may be separated by the same distance from boundaries of the standard cells. For example, in the first standard cell C21a of the first row R1 and the second standard cell C22a of the second row R2, the power taps adjacent to each other may be separated by the same distance from the boundaries of the first row R1 and the second row R2. In some embodiments, the power taps of the standard cells adjacent to each other in the first direction may be electrically connected to a single power rail extending in the second direction, and accordingly, the same power voltage may be applied to the power taps. For example, a negative supply voltage may be applied to the power taps adjacent to the boundaries of the first row R1 and the second row R2 from the power rail that vertically overlaps the boundaries of the first row R1 and the second row R2 and extends in the second direction. Also, a positive supply voltage may be applied to the power taps adjacent to the boundaries of the second row R2 and the third row R3 from the power rail that vertically overlaps the boundaries of the second row R2 and the third row R3 and extends in the second direction.

Referring to FIG. 2B, in the integrated circuit 20b, a plurality of standard cells may be aligned along a plurality of rows R1, R2, and R3 extending parallel to each other in the second direction, and the standard cells may include conductive patterns of power taps corresponding to different masks. For example, first through fourth standard cells C21b, C22b, C23b, and C24b may include conductive patterns M1_E1 of power taps patterned by a first mask on sides of the first through fourth standard cells C21b, C22b, C23b, and C24b, and may include conductive patterns M1_E2 of power taps patterned by a second mask on the other sides thereof. Accordingly, a pitch between the conductive patterns M1_E2 of the power taps included in the adjacent standard cells may be less than a pitch patterned in single-patterning, and in each of the standard cells, an area for routing the M1 layer may be increased. Although it is depicted in FIGS. 2A and 2B that the conductive patterns of the power taps are patterned by using two masks, it should be understood that the example embodiment of the inventive concepts may be applied so that different masks correspond to power taps adjacent to each other even in multi-patterning that uses more than three masks.

Figure 3:
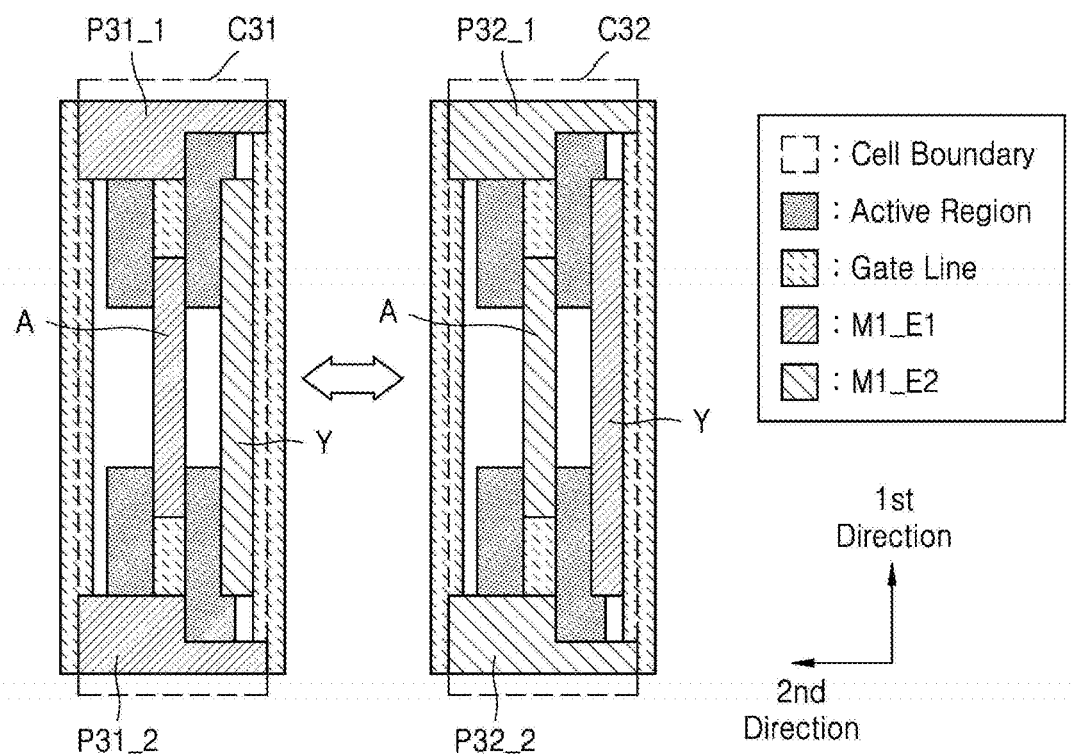
FIG. 3 is a drawing of standard cells according to an example embodiment of the inventive concepts.

FIG. 3 is a drawing of a standard cell according to an example embodiment of the inventive concepts. In detail, FIG. 3 shows an example of a standard cell included in the integrated circuit 20a of FIG. 2A. As described above with reference to FIG. 2A, in the integrated circuit 20a of FIG. 2A, the power taps of the standard cells included in the odd-number row may include the conductive patterns M1_E1 patterned by the first mask in the M1 layer, and the power taps of the standard cells included in the even number row may include conductive patterns M1_E2 patterned by the second mask in the M1 layer. A first standard cell C31 and a second standard cell C32 may provide the same functions as inverters including an input pin A and an output pin Y and may have the same structure. Hereinafter, the standard cell of FIG. 3 will be described with reference to FIG. 2A.

Referring to FIG. 3, power taps of the first standard cell C31 may include conductive patterns P31_1 and P31_2 of the M1 layer patterned by the first mask, and also, power taps of the second standard cell C32 may include conductive patterns P32_1 and P32_2 of the M1 layer patterned by the second mask. Accordingly, the first standard cell C31 may be placed on the odd-number row of the integrated circuit 20a, and the second standard cell C32 may be placed on the even number row of the integrated circuit 20b. As it will be described below with reference to FIG. 4, in a process of generating layout data that defines a layout of the integrated circuit 20a from a netlist that defines the integrated circuit 20a, it may be determined which one of the first standard cell C31 and the second standard cell C32 will be placed as an inverter. In this manner, in a layout of an integrated circuit, an operation of corresponding conductive patterns included in a power tap of a standard cell respectively to one of a plurality of masks may be referred to as a coloring of the standard cell.

Figure 4:
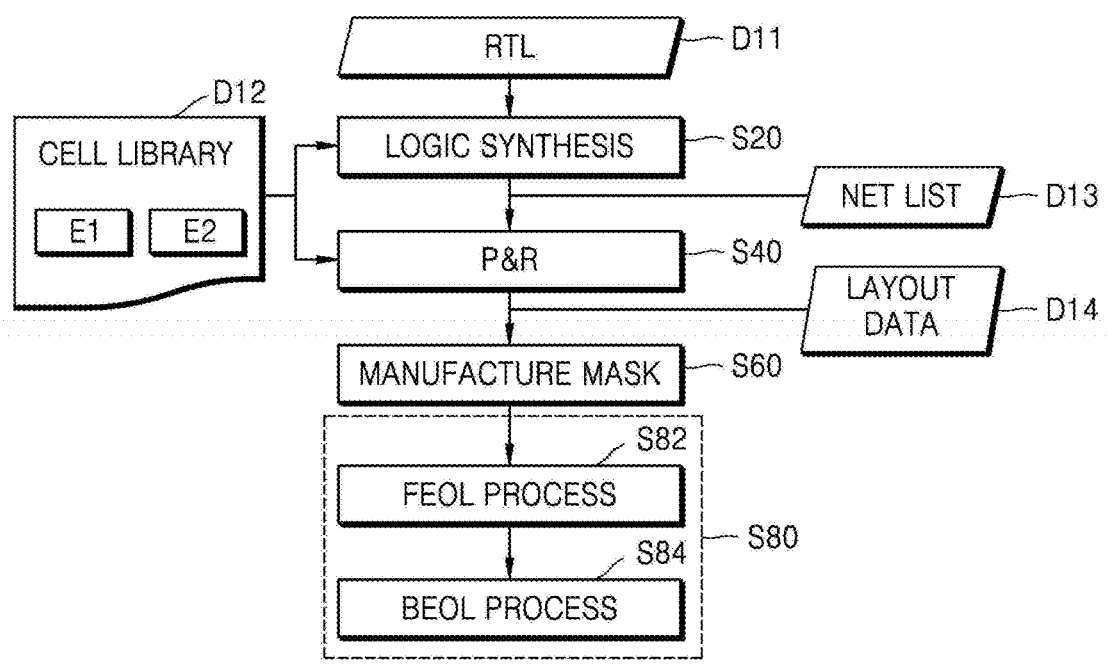
FIG. 4 is a flowchart of a method of manufacturing an integrated circuit, according to an example embodiment of the inventive concepts.

FIG. 4 is a flowchart of a method of manufacturing an integrated circuit, according to an example embodiment of the inventive concepts. In some embodiments, at least some of operations S20, S40, S60, and S80 depicted in FIG. 4 may be performed in a computing system (for example, a system-on-chip 150 of FIG. 15).

In operation S20, a logic synthesis in which a netlist is generated from register-transfer level (RTL) data D11 by referring to a cell library D12 may be performed. The RTL data D11 may define functions of an integrated circuit, and as a non-limiting example, may be formed as a hardware description language (HDL), such as a VHSIC hardware description language (VHDL) and a Verilog. The cell library D12 may define functions and properties of the standard cells. A semiconductor design tool (for example, a logic synthesis tool) may generate netlist data D13 that defines the integrated circuit, that is, may generate the netlist data D13 including a bitstream or a netlist that defines a plurality of standard cells and a connection relationship between the standard cells by performing a logic synthesis from the RTL data D11 by referring to the cell library D12.

In operation S40, an operation of placing and routing (P&R) that generates layout data D14 from the netlist data D13 by referring to the cell library D12 may be performed. The cell library D12 may define layouts of standard cells (for example, C31 and C32 of FIG. 3) having power taps that correspond to different masks but have the same functions and structures. For example, as depicted in FIG. 4, the cell library D12 may include a first group E1 that defines layouts of the standard cells including power taps patterned by a first mask and a second group E2 that defines layouts of the standard cells including power taps by a second mask. The standard cells defined by the first group E1 and the standard cells defined by the second group E2 may have the same functions and structures as each other. For example, the layout of the first standard cell C31 of FIG. 3 may be defined by the first group E1, and the layout of the second standard cell C32 may be defined by the second group E2.

A semiconductor design rule (for example, the P&R rule) may place a plurality of standard cells by referring to the cell library D12 from the netlist data D13, and may route input pins, output pins, and power taps of the standard cells. As described above with reference to FIG. 2A, the standard cells defined by the first group E1 may be placed on the odd-number rows, and the standard cells defined by the second group E2 may be placed on the even number rows. That is, operation S40 may include a coloring operation of the standard cells. The layout data D14 may have, for example, a format like GDSII, and may include information about a layout of an integrated circuit, that is, geometric information of the standard cells and mutual connections thereof. An example of the operation S40 will be described below with reference to FIG. 5.

In operation S60, an operation of making a mask may be performed. For example, when an optical proximity correction (OPC) is applied to the layout data D14, patterns of the mask may be defined to form patterns formed on a plurality of layers, and at least one mask (or a photomask) for forming patterns of each of the layers may be made. In some embodiments, as it will be described below with reference to FIG. 6, the first and second masks for patterning the M1 layer may be manufactured.

In operation S80, an operation of forming an integrated circuit may be performed. For example, the integrated circuit may be manufactured by patterning the layers by using at least one mask manufactured in the operation S60. As depicted in FIG. 4, the operation S80 may include operation S82 and operation S84.

In operation S82, a front-end-of-line (FEOL) process may be performed. The FEOL process may refer to a process of forming individual devices, for example, transistors, capacitors, resistors, etc. on a substrate in a process of manufacturing an integrated circuit. For example, the FEOL process may include a process of planarizing and cleaning a wafer, a process of forming a trench, a process of forming a well, a process of forming a gate line, and a process of forming a source and a drain.

In operation S84, a back-end-of-line (BEOL) process may be performed. The BEOL process may be referred to as a process of connecting individual devices, for example, transistors, capacitors, resistors, etc. in a process of manufacturing an integrated circuit. For example, the BEOL process may include a process of silicidation of regions of a gate, a source, and a drain, a process of adding a dielectric body, a planarization process, a process of forming a hole, a process of adding a metal layer, a process of forming a via, a process of forming a passivation layer, etc. In some embodiments, as described below with reference to FIG. 6, the operation S84 may include a process of patterning power taps of standard cells. Afterwards, the integrated circuit may be packaged on a semiconductor package and may be used as a component for various applications.

Figure 5:
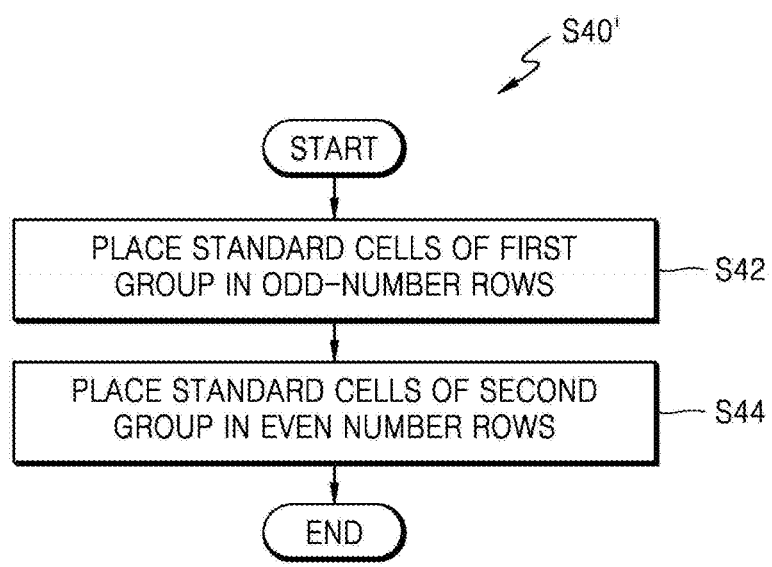
FIG. 5 is a flowchart of operation S40 of FIG. 4, according to an example embodiment of the inventive concepts.

FIG. 5 is a flowchart of operation S40 of FIG. 4, according to an example embodiment of the inventive concepts. In detail, FIG. 4 shows a method of placing standard cells in a layout of an integrated circuit, and, as depicted in FIG. 5, operation S40' may include operations S42 and S44. As described above with reference to FIG. 4, a placing and routing (P&R) may be performed in the operation S40', and hereinafter, the operation S40' of FIG. 5 will be described with reference to FIG. 4.

In operation S42, an operation of placement the standard cells of the first group E1 on the odd-number rows may be performed. As described above with reference to FIG. 4, the first group E1 may define layouts of the standard cells including power taps patterned by the first mask, and the standard cells of the first group E1 may be placed on the odd-number rows.

In operation S44, an operation of placing the standard cells of the second group E2 may be performed. As described above with reference to FIG. 4, the second group E2 may define layouts of the standard cells including power taps patterned by the second mask, and the standard cells of the second group E2 may be placed on the even-number rows.

In some embodiments, unlike the operation S40' depicted in FIG. 5, in the operation S42, the placement of the standard cells of the first group E1 on the even-number rows may be performed, and afterwards, in the operation S44, the placement of the standard cells of the second group E2 on the odd-number rows may be performed.

Figure 6:
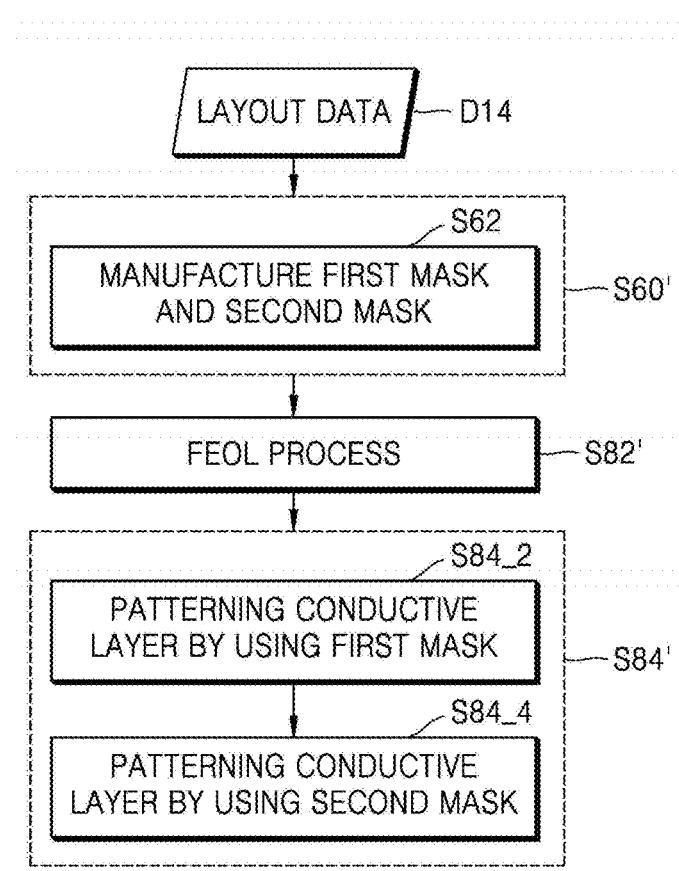
FIG. 6 is a flowchart of operations S60 and S84 of FIG. 4, according to an example embodiment of the inventive concepts.

FIG. 6 is a flowchart of operations S60, S82, and S84 of FIG. 4, according to an example embodiment of the inventive concepts. As described above with reference to FIG. 4, in operation S60' of FIG. 6, the manufacturing of a mask may be performed, and in operation S84', a BEOL process may be performed. As depicted in FIG. 6, the operation S60' may include operation S62, and the operation S84' may include operation S84_2 and operation S84_4.

In operation S62, the manufacturing of the first and second masks may be performed based on the layout data D14. The first and second masks may be used for multi-patterning the M1 layer, conductive patterns patterned by the first mask and conductive patterns patterned by the second mask may have a pitch less than a pitch between the conductive patterns patterned by a single mask. As described above with reference to FIG. 4, the layout data D14 may define a layout of an integrated circuit, and may include information about a mask corresponding to the conductive patterns of the M1 layer. For example, the layout data D14 may define shapes of the power taps corresponding to the first mask and shapes of the power taps corresponding to the second mask, and the first and second masks may be manufactured based on the layout data D14. Next, in operation S82', an FEOL process may be performed, and afterwards, in operation S84', a BEOL process may be performed.

In operation S84_2, the patterning of a conductive layer by using the first mask may be performed. For example, in order to manufacture the integrated circuit 20a of FIG. 2A, the power taps of the standard cells disposed on the odd-number rows may be patterned by using the first mask.

In operation S84_4, the patterning of the conductive layer by using the second mask may be performed. For example, in order to manufacture the integrated circuit 20a of FIG. 2A, the power taps of the standard cells disposed on the even-number rows may be patterned by using the second mask. In some embodiments, unlike the operation S84' depicted in FIG. 6, the conductive layer may be patterned by using the first mask after patterning by using the second mask.

FIGS. 7(a)-7(c) are drawings showing an example of power taps of standard cells adjacent to each other according to an example embodiment of the inventive concepts. In detail, FIG. 7(a) shows a pitch P_M12 provided by multi-patterning in the M1 layer as a conductive layer, FIG. 7(b) shows a pitch P_M11 provided by single-patterning, and FIG. 7(c) shows a pitch P_V11 between vias disposed on the conductive layer.

As depicted in FIG. 7(a), the power taps of the standard cells adjacent to each other in the first direction may be patterned by different masks. Accordingly, the pitch P_M12 of the power taps may be less than the pitch P_M11 provided by the single-patterning.

Referring to FIG. 7(c), a design rule may define a minimum gap between patterns of the conductive layer, and also, may define a minimum gap between vias disposed on the conductive layer. In some embodiments, a minimum gap between the vias may be greater than a gap between the patterns provided by the single-patterning (that is, P_V11≥P_M11). Accordingly, as depicted in FIG. 7(c), when the vias are disposed in the first direction in power taps adjacent to each other, a pitch between the power taps may be determined by the pitch P_V11 between the vias, wherein the pitch P_V11 is greater than the pitch P_M12 provided by multi-patterning and also greater than the pitch P_M11 provided by single-patterning. Hereinafter, according to the example embodiment of the inventive concepts, a structure for disposing the vias while maintaining the pitch P_M12 provided by multi-patterning in the conductive layer and a method of disposing the vias will be described with reference to FIG. 8.

Figure 8:
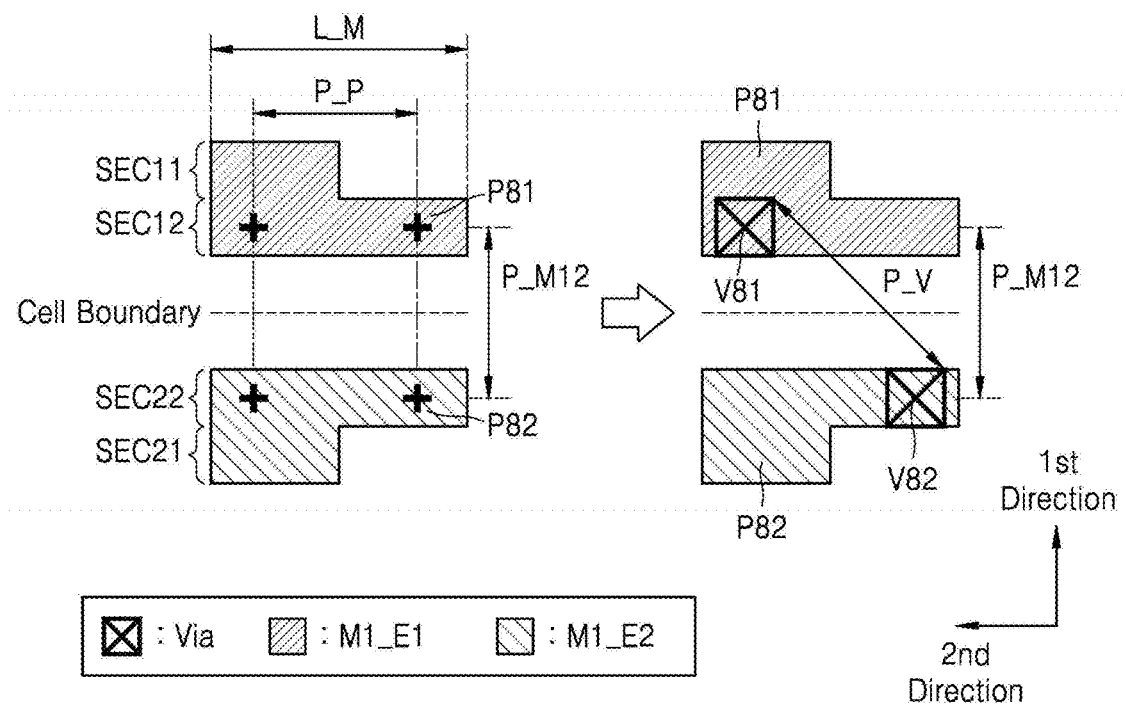
FIG. 8 is a drawing showing an example of disposition of vias on power taps according to an example embodiment of the inventive concepts.

FIG. 8 is a drawing showing an example of disposition of vias on first and second power taps according to an example embodiment of the inventive concepts. In detail, the drawing on the left side of FIG. 8 shows first and second power taps P81 and P82 and a marking layer before disposing the vias, and the drawing on the right side of FIG. 8 shows the first and second power taps P81 and P82 and first and second vias V81 and V82 disposed on the first and second power taps P81 and P82. As depicted in FIG. 8, the first and second power taps P81 and P82 of the standard cells adjacent to each other in the first direction respectively may be patterned by different masks, and accordingly, may have the pitch P_M12 provided by multi-patterning.

Figure 9:
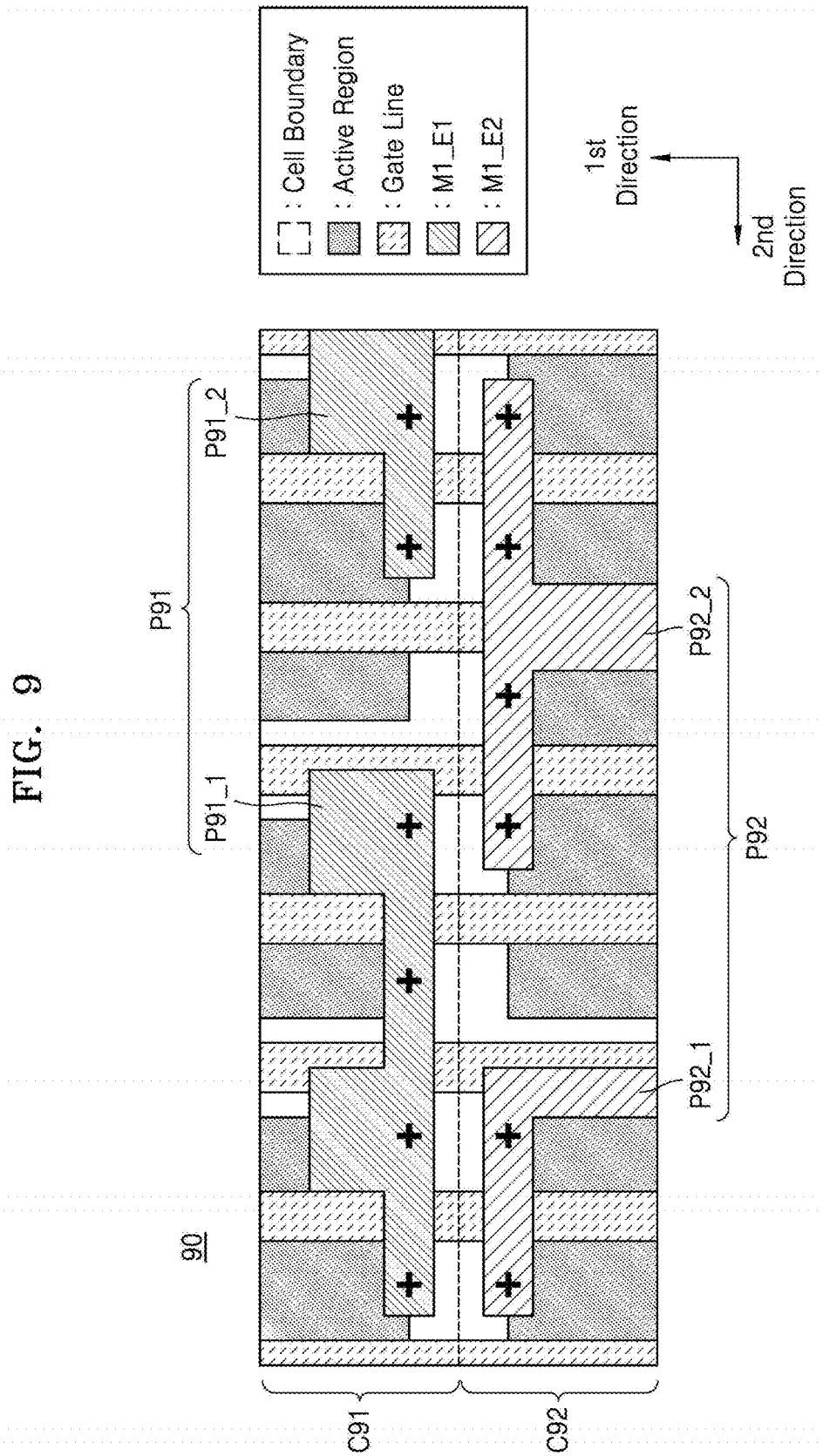
FIG. 9 is a drawing showing an integrated circuit and a marking layer according to an example embodiment of the inventive concepts.

In some embodiments, the first and second power taps P81 and P82 may include outer portions SEC12 and SEC22 that have a certain length L_M in the second direction and are adjacent to a cell boundary. For example, as depicted in FIG. 8, but not limited thereto the first power tap P81 may include an outer portion SEC12 that has a length greater than the length L_M in the second direction and may be adjacent to the cell boundary and an inner portion SEC11. Similarly, the second power tap P82 may also include an outer portion SEC22 that has a length greater than the length L_M in the second direction and may be adjacent to the cell boundary and an inner portion SEC21. In FIG. 8, although it is depicted that the outer portion SEC12 of the first power tap P81 and the outer portion SEC22 of the second power tap P82 have the same minimum length L_M in the second direction, but, as depicted in FIG. 9, in some embodiments, the power taps adjacent to each other may have lengths different from each other in the second direction.

As depicted by "+" in FIG. 8, a marking layer (may be referred to as a first marking layer) that indicates candidate points of the first and second power taps P81 and P82 on which the vias are disposed may be present on the outer portion SEC12 and SEC22 of the first and second power taps P81 and P82. The marking layer is an imaginary layer and may provide a guide required for determining a layout of an integrated circuit by placing and routing standard cells. For example, referring to FIG. 4, the cell library D12 may define the marking layer that indicates candidate points of the power taps of the standard cells on which the vias are disposed, and in the operation S40, when performing a P&R, the vias may be disposed on the power taps according to the marking layer of the cell library D12. As depicted in FIG. 8, the marking layer may define candidate points of the first and second power taps P81 and P82 separated by a distance P_P in the second direction, and the outer portions SEC12 and SEC22 of the first and second power taps P81 and P82 may vertically overlap with at least two candidate points of the first and second power taps P81 and P82 in the second direction. For example, as depicted in the left side of FIG. 8, the outer portion SEC12 of the first power tap P81 may include two candidate points separated by the distance P_P and the minimum length L_M of the outer portion SEC12 in the second direction may be defined as a length by which vias are able to be disposed in the two candidate points. Also, in some embodiments, candidate points of the first and second power taps P81 and P82 defined by the marking layer may be aligned in the first direction. For example, as depicted on the left side of FIG. 8, the two candidate points included in the outer portion SEC12 of the first power tap P81 may be aligned with the two candidate points included in the outer portion SEC22 of the second power tap P82 in the first direction, respectively.

In some embodiments, the first and second vias V81 and V82 may be disposed not to be aligned in the first direction in the first and second power taps P81 and P82 adjacent to each other. For example, as depicted in the right side of FIG. 8, the first via V81 may be disposed on a left point of the two candidate points of the first power taps P81 that overlap the outer portion SEC12 of the first power tap P81, and the second via V82 may be disposed on a right point of the two candidate points of the second power tap P82 that overlap the outer portion SEC22 of the second power tap P82. Accordingly, a pitch P_V between the first and second vias V81 and V82 may be ensured, and when the pitch P_V is greater than a pitch between vias according to the design rule, that is, the pitch P_V11 of FIG. 7, the first and second vias V81 and V82 may comply with the design rule.

Figure 7:
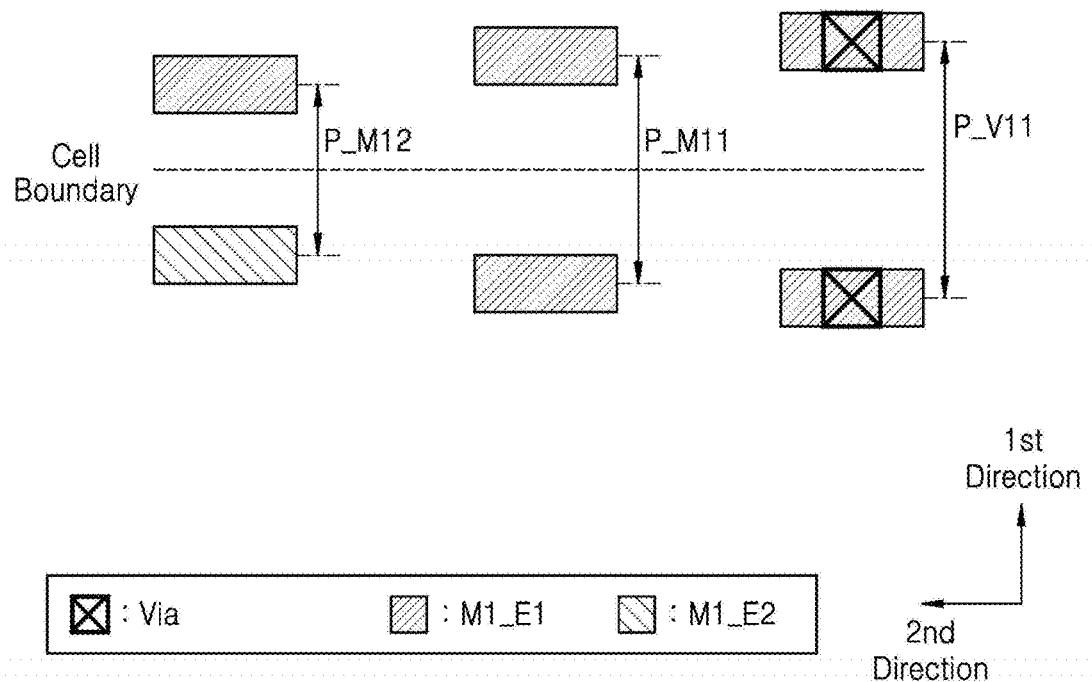
FIGS. 7(a)-7(c) are drawings showing an example of power taps of standard cells adjacent to each other according to an example embodiment of the inventive concepts.

In some embodiments, the distance P_P in the second direction between the candidate points of the first and second power taps P81 and P82 defined by the marking layer may be determined to comply with a design rule when the first and second vias V81 and V82 are not aligned in the first direction on the power taps of the different standard cells. For example, as depicted in FIG. 7, when the minimum pitch P_M12 provided by multi-patterning in the M1 layer and the minimum pitch P_V11 between the vias are defined by a design rule, the distance P_P defined by the marking layer may be defined as Equation 1 below.

$$P\_V = \sqrt{P\_M12^2 + P\_P^2} \geq P\_V11$$

$$P\_P \geq \sqrt{P\_V11^2 - P\_M12^2}$$ [Equation 1]

The first and second power taps P81 and P82 may include the outer portions (for example, SEC12 and SEC22) having a minimum distance L_M that is greater than the distance P_P so that the vias are disposed on the candidate points separated by the distance P_P that satisfy Equation 1. Inner portions (for example, SEC11 and SEC21) connected to the outer portions SEC12 and SEC22 of the power taps may extend in the first direction, and may be electrically connected to an active region or a gate line of the standard cell through contacts.

In some embodiments, the pitch P_V11 between the vias defined by a design rule may correspond to a pitch required when the vias are formed by single-patterning. In this case, when the candidate points of the power taps defined by the marking layer satisfy the Equation 1 and are disposed not to be aligned in the first direction, the disposed vias may be formed by single-patterning. Accordingly, the vias disposed on the power taps may be formed by single-patterning, and as a result, cost and time consumed for manufacturing an integrated circuit may be reduced.

FIG. 9 is a drawing showing an integrated circuit and a marking layer according to an example embodiment of the inventive concepts. In detail, FIG. 9 shows a boundary of first and second standard cells C91 and C92 and the marking layer that defines candidate points of first and second power taps P91 and P92 on which vias are disposed. As described above with reference to FIG. 8, the first and second power taps P91 and P92 of the first and second standard cells C91 and C92 that are adjacent to each other in the first direction respectively may correspond to different masks, and the marking layer, as indicated as "+" in FIG. 9 may define candidate points of the first and second power taps P91 and P92 on which vias are able to be disposed.

Referring to FIG. 9, the first power tap P91 of the first standard cell C91 may include conductive patterns P91_1 and P91_2 that are patterned by a first mask, and the second power tap P92 of the second standard cell C92 may include conductive patterns P92_1 and P92_2 that are patterned by a second mask. Accordingly, the first and second power taps P91 and P92 may have a pitch provided by multi-patterning. As depicted in FIG. 9, the marking layer may define candidate points of the first and second power taps P91 and P92 on which vias are able to be disposed. The conductive patterns P91_1 and P91_2 of the first power tap P91 and the conductive patterns P92_1 and P92_2 of the second power tap P92 respectively may overlap at least two candidate points of the first and second power taps P91 and P92 defined by the marking layer.

As described above with reference to FIG. 8, the candidate points of the first and second power taps P91 and P92 defined by the marking layer may be aligned in the first direction, but the vias may be disposed not to be aligned in the first direction on candidate points of the first and second power taps P91 and P92 defined by the marking layer. For example, a distance between the candidate points of the first and second power taps P91 and P92 defined by the marking layer in the second direction may be defined to satisfy Equation 1, and accordingly, when vias are not aligned in the first direction on the candidate points of the first and second power taps P91 and P92, the vias may comply a pitch (for example, P_V11 of FIG. 7(c)) between the vias defined by a design rule. Hereinafter, examples of determining candidate points of the first and second power taps P91 and P92, on which vias are disposed, defined by the marking layer will be described with reference to FIGS. 10A and 10B.

Figure 10A:
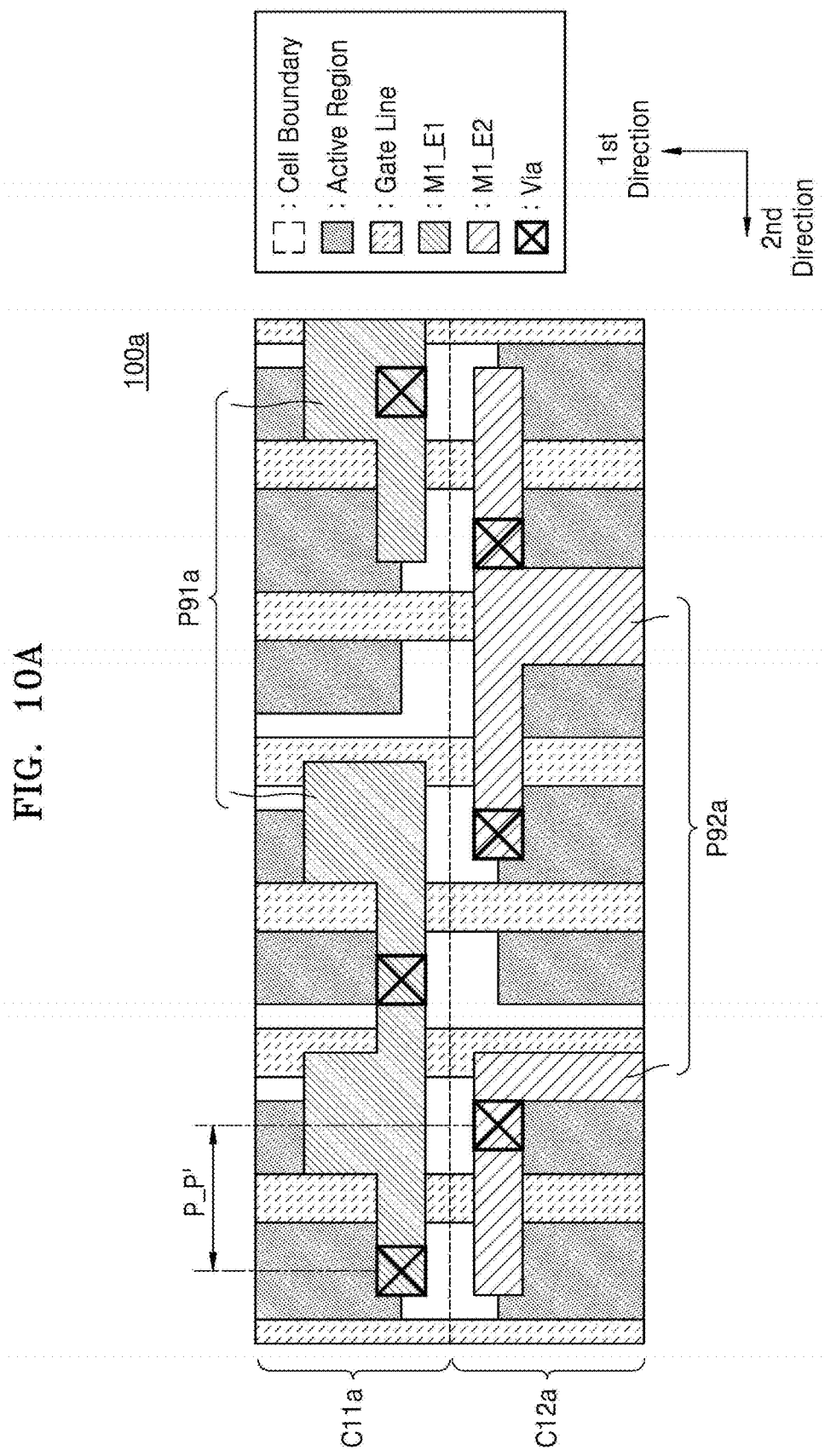
FIGS. 10A and 10B illustrate integrated circuits according to example embodiments of the inventive concepts.
Figure 10B:
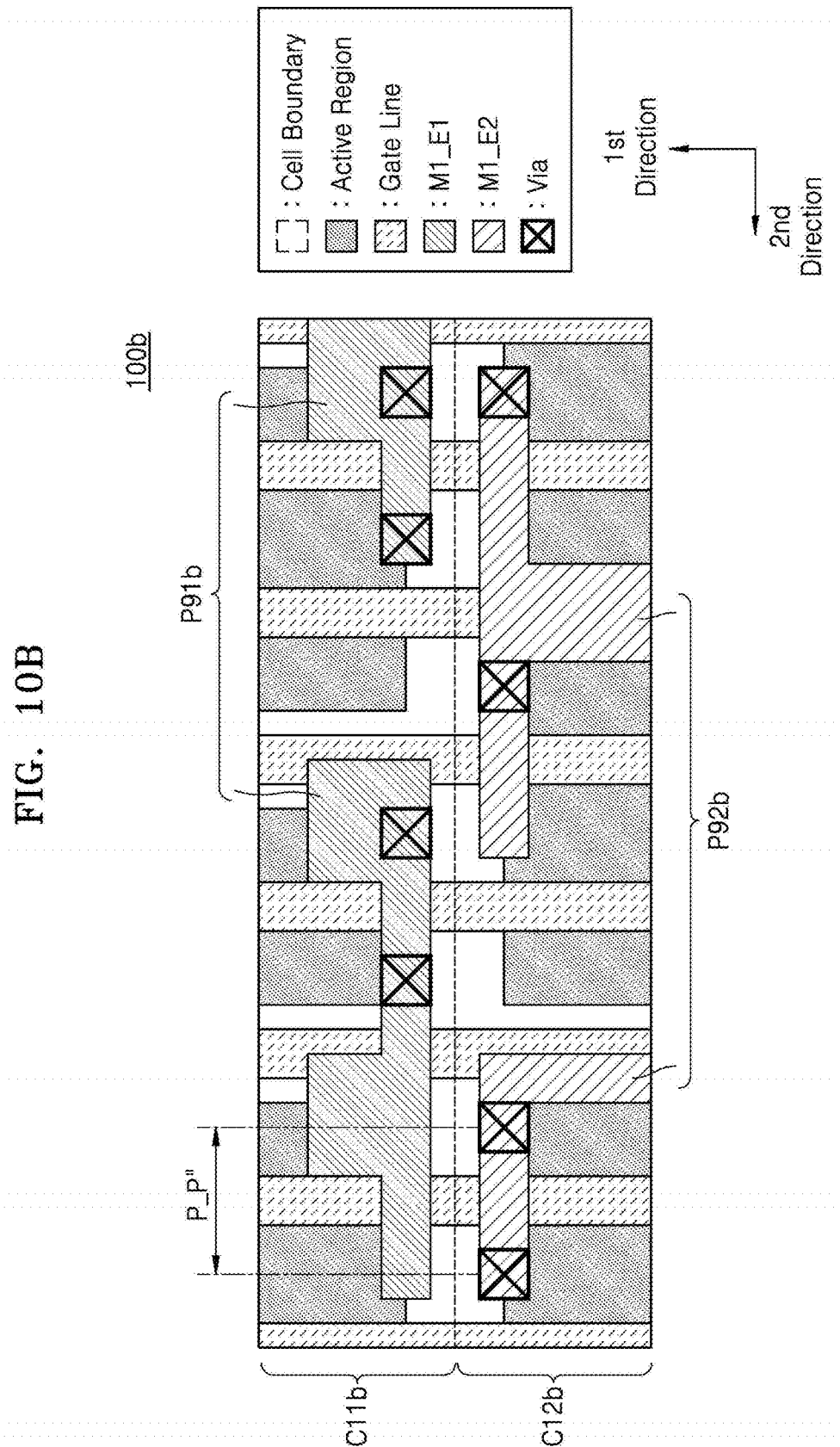

FIGS. 10A and 10B illustrate integrated circuits 100a and 100b according to example embodiments of the inventive concepts. In detail, FIGS. 10A and 10B show layouts of the integrated circuits 100a and 100b including vias disposed on some candidate points of power taps defined by the marking layer of FIG. 9. As depicted in FIGS. 10A and 10B, the integrated circuits 100a and 100b may include first standard cells C11a and C11b and second standard cells C12a and C12b, respectively. Hereinafter, the integrated circuits 100a and 100b will be described with reference to FIG. 9.

Referring to FIG. 10A, in some embodiments, on the power taps defined by a marking layer, a distance P_P' between candidate points that are separated in the second direction and on which vias are able to be disposed may be less than the pitch (that is, P_V11 of FIG. 7(c)) between the vias defined by a design rule. Accordingly, in order to comply with the design rule, the vias may not be simultaneously disposed on the candidate points of the power taps adjacent in the second direction. For example, as depicted in FIG. 10A, the vias disposed on a first power tap P91a of the first standard cell C11a and vias disposed on a second power tap P92a of the second standard cell C12a may not be aligned in the first direction and also may not be adjacently disposed to have a pitch P_P' in the second direction.

Referring to FIG. 10B, in some embodiments, on the power taps defined by a marking layer, a distance, that is, the distance P_P'' of FIG. 10B between candidate points that are separated in the second direction and on which vias are able to be disposed may be greater than the pitch (that is, P_V11 of FIG. 7(c)) between the vias defined by a design rule. Accordingly, the vias may be simultaneously disposed on the candidate points of the power taps adjacent to each other in the second direction. For example, as depicted in FIG. 10B, the vias disposed on a first power tap P91b of the first standard cell C11b and the vias disposed on a second power tap P92b of the second standard cell C12b may not be aligned in the first direction and but may include vias having a pitch P_P'' in the second direction.

Figure 11:
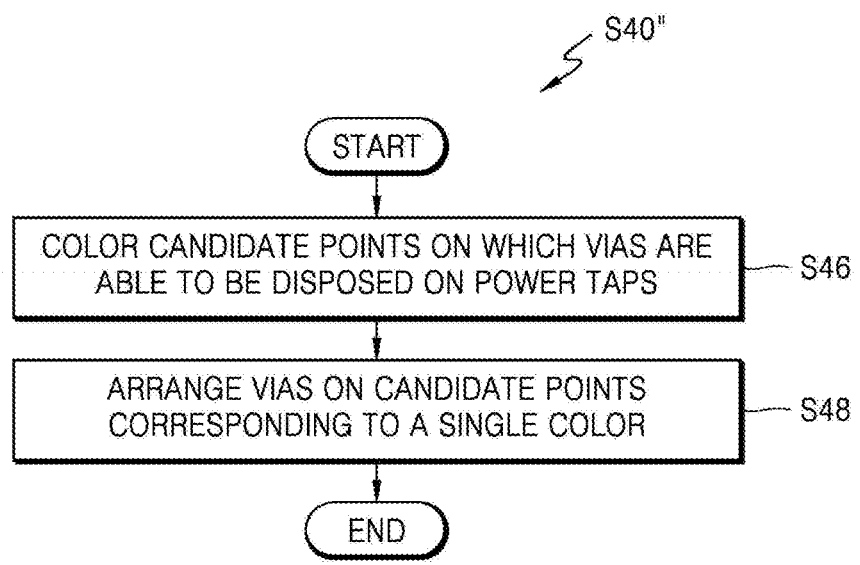
FIG. 11 is a flowchart of operation S40 of FIG. 4, according to an example embodiment of the inventive concepts.

FIG. 11 is a flowchart of operation S40 of FIG. 4, according to an example embodiment of the inventive concepts. In detail, FIG. 11 shows a method of disposing vias on power taps. As depicted in FIG. 11, operation S40''' may include operation S46 and operation S48. As described above with reference to FIG. 4, in the operation S40''', the P&R may be performed, and hereinafter, the operation S40''' of FIG. 11 will be described with reference to FIG. 9.

In operation S46, coloring of candidate points of the power taps on which vias are able to be disposed may be performed. For example, based on a pitch between vias provided by single-patterning and a pitch between vias provided by multi-patterning, corresponding of candidate points of the power taps on which vias are able to be disposed respectively to one of two masks may be performed. The candidate points of the power taps on which vias are able to be disposed and that respectively correspond to one of the two masks by coloring may be referred to as having a color of the corresponding mask.

In operation S48, disposing of vias on the candidate points of the power taps corresponding to a single color may be performed. In operation S46, the candidate points of the power taps corresponding to a single color may comply with a pitch between vias provided by single-patterning through coloring the candidate points of the power taps on which vias are able to be disposed. Accordingly, the vias may be disposed on the candidate points of the power taps corresponding to the single color, and the disposed vias may comply with a pitch between the vias provided by the single-patterning.

Figure 12:
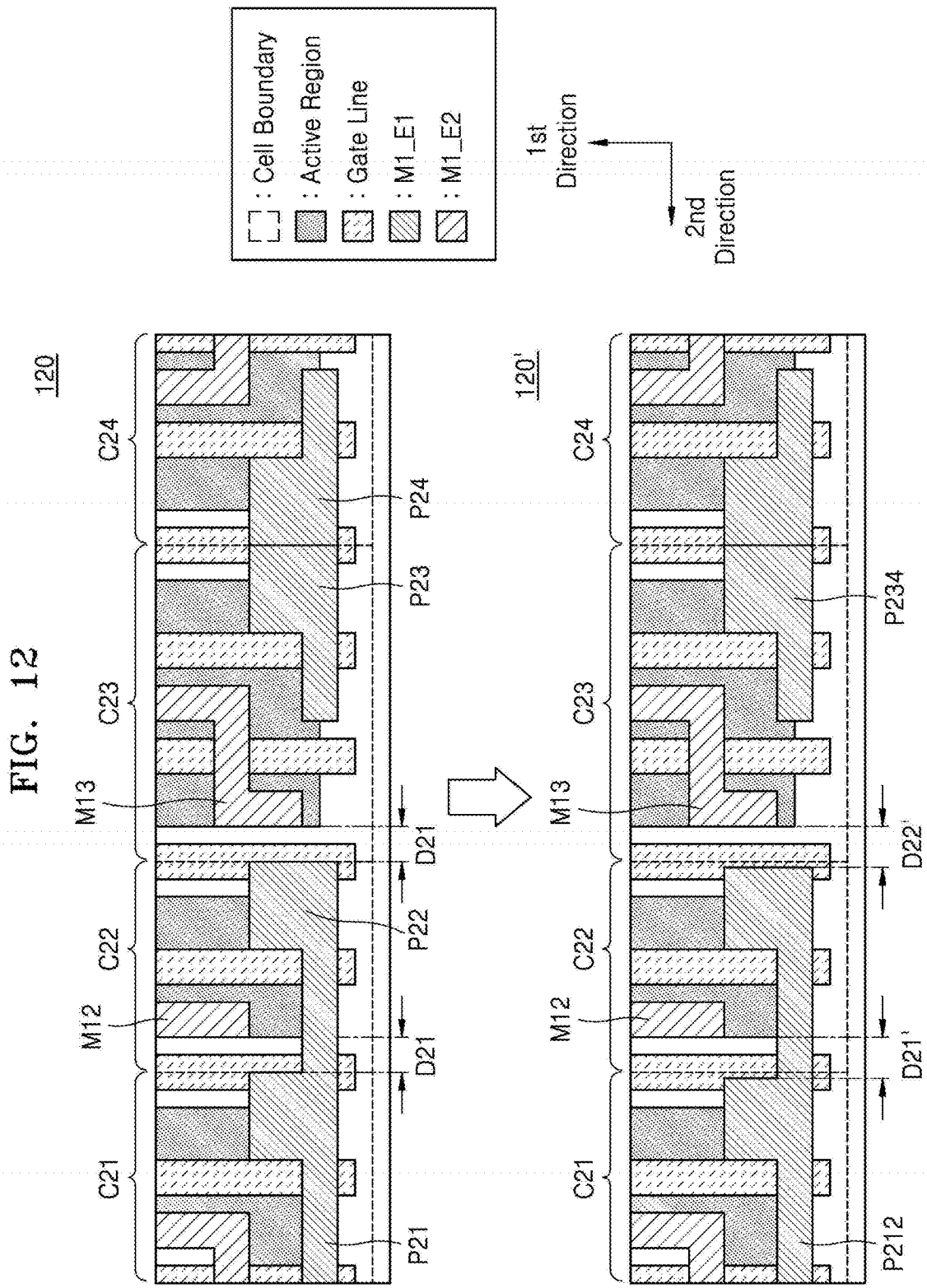
FIG. 12 is a drawing showing an example of changing power taps according to an example embodiment of the inventive concepts.

FIG. 12 is a drawing showing an example of changing power taps according to an example embodiment of the inventive concepts. In detail, an upper drawing of FIG. 12 shows a layout of an integrated circuit 120 on which standard cells are placed, and a lower drawing of FIG. 12 shows a layout of an integrated circuit 120' after power taps of the integrated circuit 120 are changed.

Referring to the upper drawing of FIG. 12, the integrated circuit 120 may include first through fourth standard cells C21 through C24, and the first through fourth standard cells C21 through C24 may be formed by the same mask, that is, may include first through fourth power taps P21 through P24 corresponding to a first mask. In some embodiments, the first through fourth power taps P21 through P24 may have a pitch provided by multi-patterning with respect to power taps of other standard cells adjacent to the first through fourth standard cells C21 through C24.

When the first through fourth standard cells C21 through C24 are sequentially placed, the first through fourth power taps P21 through P24 to which the same power voltage, for example, a negative supply voltage is applied may be aligned. For example, the first and second power taps P21 and P22 may contact each other at a boundary of the first and second standard cells C21 and C22. However, the second and third power taps P22 and P23 may be separated from each other due to a conductive pattern M13. Also, the first and second power taps P21 and P22 may have different lengths in the first direction at the boundary of the first and second standard cells C21 and C22. However, the third and fourth power taps P23 and P24 may have the same length in the first direction at a boundary of the third and fourth standard cells C23 and C24. In this manner, the power taps may face each other in various ways at the boundary between standard cells placed in the same row, that is, the standard cells adjacent to each other in the second direction.

Power taps included in a single standard cell may cause a design rule violation with respect to a conductive pattern, for example, a conductive pattern for a signal included in an adjacent standard cell. For example, as depicted in the upper drawing of FIG. 12, a distance D21 between the first power tap P21 of the first standard cells C21 and a conductive pattern M12 of the second standard cell C22 may be less than a minimum distance provided by multi-patterning defined by the design rule. Similarly, a distance D22 between the second power tap P22 of the second standard cell C22 and a conductive pattern M13 of the third standard cell C23 may also be less than a minimum distance provided by multi-patterning defined by the design rule. As it will be described below, power taps of standard cells may be changed according to types of the power taps of standard cells adjacent to each other in the same row, and accordingly, the design rule violation due to power taps may be eased.

Referring to the lower drawing of FIG. 12, in some embodiments, portions of power taps contacting each other at a boundary of standard cells may be merged. For example, the first power tap P21 and the second power tap P22 of the integrated circuit 120 may be connected, and accordingly, the first power tap P21 and the second power tap P22 may be merged to a conductive pattern P212 of the integrated circuit 120'. Also, the third and fourth power taps P23 and P24 may be connected, and accordingly, the third and fourth power taps P23 and P24 may be merged to a conductive pattern P234.

In some embodiments, portions of power taps that are not in contact each other at the boundary of the standard cells may be removed. For example, in the first power tap P21 of the integrated circuit 120, a portion of the first power tap P21 that contacts the boundary of the first standard cell C21 but does not contact the second power tap P22 may be removed to be separated from the boundary of the first standard cell C21 as the conductive pattern P212 of the integrated circuit 120'. Also, in the second power tap P22 of the integrated circuit 120, a portion of the second power tap P22 that contacts the boundary of the second standard cell C22 but does not contact the third power tap P23 may be removed to be separated from the boundary of the second standard cell C22 as the conductive pattern P234 of the integrated circuit 120'. Accordingly, the distance D21 between the first power tap P21 and the conductive pattern M12 of the second standard cell C22 may extend to a distance D21' in the integrated circuit 120', and the distance D22 between the second power tap P22 and the conductive pattern M13 of the third standard cell C23 may extend to a distance D22'. In the integrated circuit 120', the distance D21' and the distance D22' may be greater than a minimum distance between patterns provided by multi-patterning, and accordingly, the design rule violation of the power taps in the integrated circuit 120' may be solved. That is, since some portions of the first power tap P11 and the second power tap P12 are removed, a separation distance from the boundary of the standard cells may be determined by a pitch provided by multi-patterning defined by a design rule.

Figure 13:
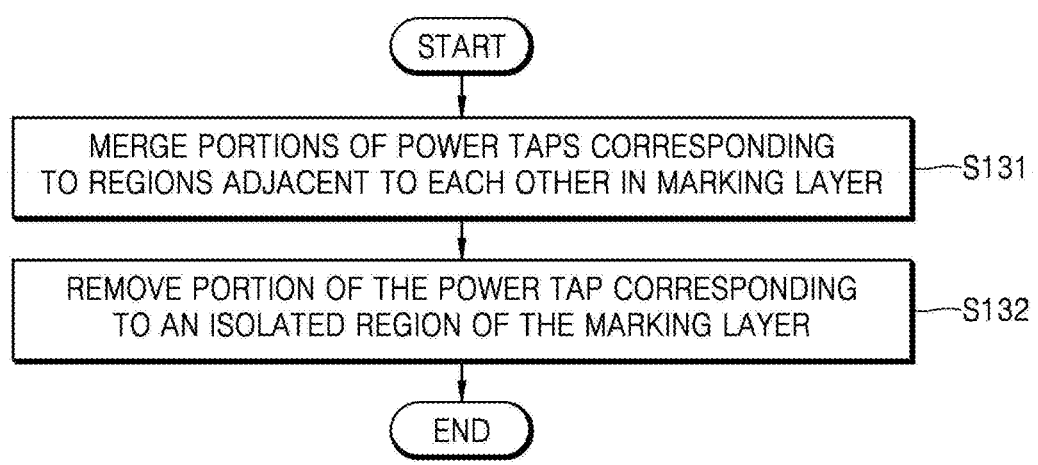
FIG. 13 is a flowchart of a method of manufacturing an integrated circuit, according to an example embodiment of the inventive concepts.
Figure 14:
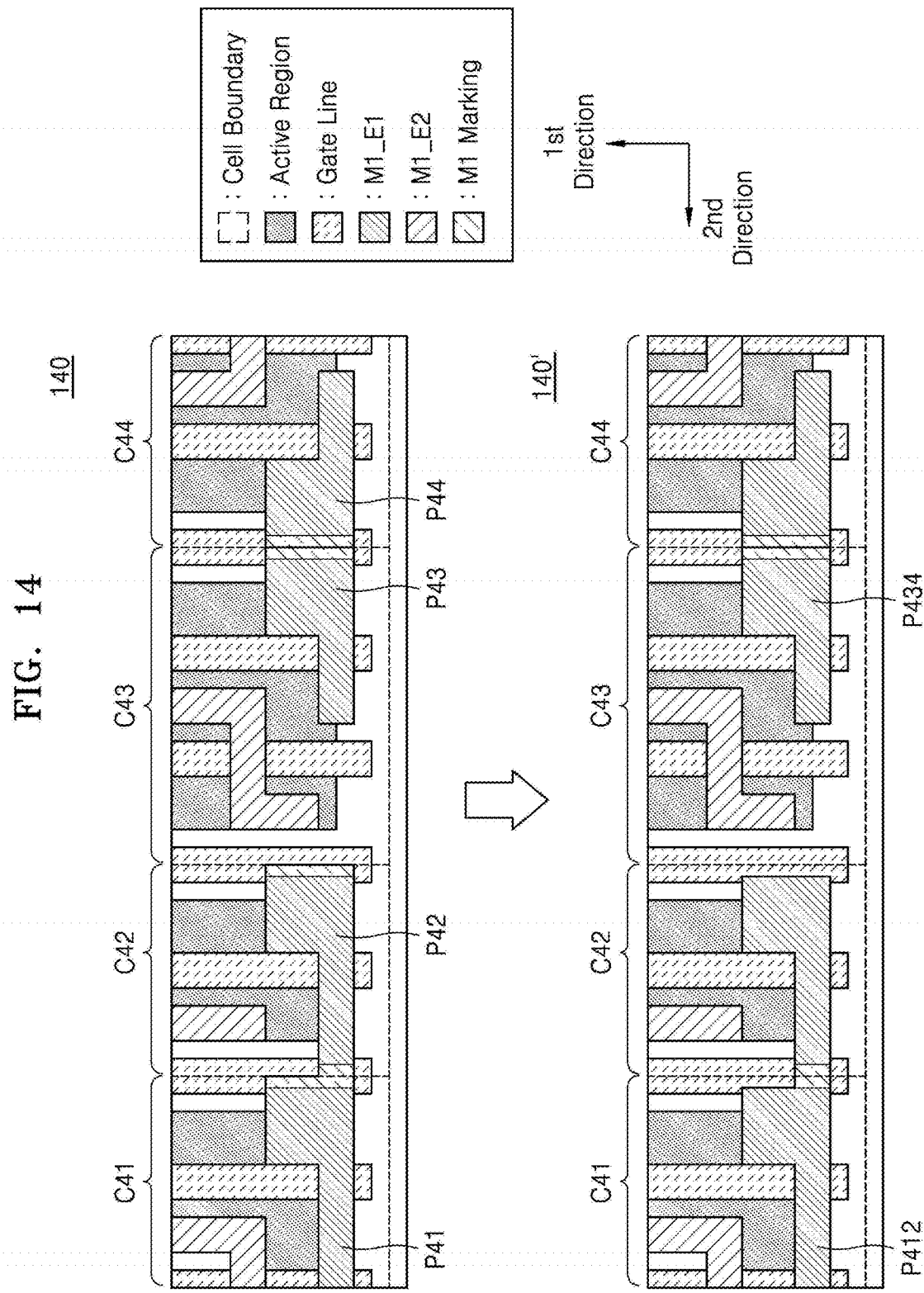
FIG. 14 is a drawing showing an example of changing a layout of an integrated circuit according to the method of FIG. 13, according to an example embodiment of the inventive concepts.

FIG. 13 is a flowchart of a method of manufacturing an integrated circuit according to an example embodiment of the inventive concepts. FIG. 14 is a drawing showing an example of changing a layout of an integrated circuit according to the method of FIG. 13, according to an example embodiment of the inventive concepts. In detail, FIG. 13 shows a method of changing power taps of standard cells adjacent to each other in the same row. In some embodiments, the method described in FIG. 13 may include the operation S40 of FIG. 4 or may be performed in a process of applying an OPC in the operation S60 of FIG. 4. As described below with reference to FIGS. 13 and 14, hereinafter, the power taps may be changed by using a marking layer that shows regions that vertically overlap the power taps and contact a boundary of the standard cells.

Referring to FIG. 13, in operation S131, merging of portions of power taps corresponding to the regions adjacent to each other in a marking layer may be performed. A marking layer (may be referred to as a second marking layer) that overlaps power taps in the vertical direction and indicates regions contacting a boundary of standard cells may be present. For example, referring to an integrated circuit 140 of FIG. 14, regions where a boundary between first and second standard cells C41 and C42 contact first and second power taps P41 and P42 may be defined by the marking layer, a region where a boundary between the second standard cell C42 and a third standard cell C43 contact the second power tap P42 may be defined by the marking layer, and regions where a boundary between the third standard cell C43 and a fourth standard cell C44 contact third and fourth power taps P43 and P44 may be defined by the marking layer. Portions of the power taps corresponding to the regions adjacent to the marking layer may be merged by connecting to each other. Accordingly, a conductive pattern P412 and a conductive pattern P434 of an integrated circuit 140' may be formed.

Referring to FIG. 13, in operation S132, removing of portions of the power taps corresponding to isolated regions of the marking layer may be performed. For example, referring to the integrated circuit 140 of FIG. 14, of regions of the marking layer that overlaps the first power tap P41, a region that does not contact the region of the marking layer that overlaps the second power tap P42, that is, an isolated region in the second direction may be removed, and accordingly, a shape, such as a conductive pattern P412 may be formed near the boundary between the first and second standard cells C41 and C42 of the integrated circuit 140'. Also, in the integrated circuit 140, a region of the marking layer that overlaps the second power tap P42 may be removed since the region is not adjacent to a region of the marking layer that overlaps the third power tap P43, and accordingly, a shape, such as the conductive pattern P412 may be formed near the boundary between the second and third standard cells C42 and C43 of the integrated circuit 140'.

Figure 15:
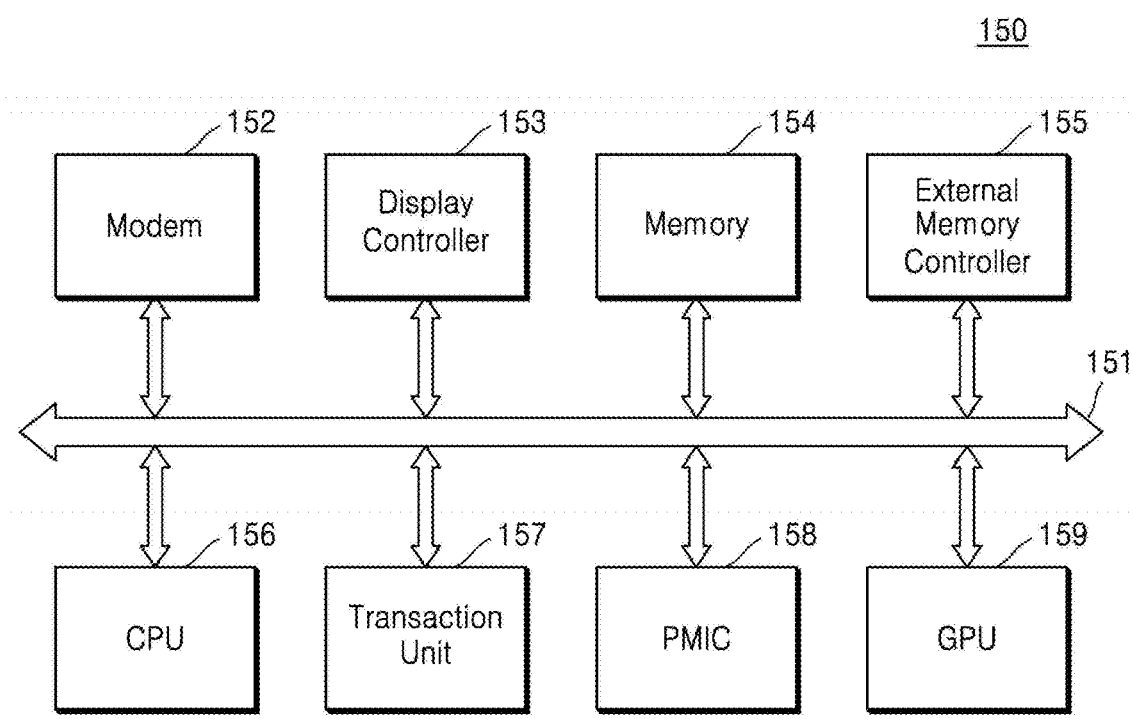
FIG. 15 is a block diagram of a system-on-chip according to an example embodiment of the inventive concepts.

FIG. 15 is a block diagram of a system-on-chip (SoC) 150 according to an example embodiment of the inventive concepts. The SoC 150, as a semiconductor device, may include an integrated circuit according to an example embodiment of the inventive concepts. The SoC 150 is a device on which complicated functional blocks 152, 153, 154, 155, 157, 158, and/or 159, such as intellectual property (IP) that performs various functions are realized on a single chip, and the standard cells according to example embodiments of the inventive concepts may be included in each of the functional blocks 152, 153, 154, 155, 157, 158, and/or 159 of the SoC 150. Accordingly, the SoC 150 that provides increased space efficiency and/or higher productivity may be achieved.

Referring to FIG. 15, the SoC 150 may include a modem 152, a display controller 153, a memory 154, an external memory controller 155, a central processing unit (CPU) 156, a transaction unit 157, a power management integrated circuit (PMIC) 158, and/or a graphics processing unit (GPU) 159. Each of the functional blocks 152, 153, 154, 155, 157, 158, and/or 159 of the SoC 150 may communicate with each other through a system bus 151. In some embodiments, the SoC 150 may include some of the constituent elements depicted in FIG. 15.

The CPU 156 that may control general operation of the SoC 150 may control operations of the functional blocks 152, 153, 154, 155, 157, 158, and/or 159, namely, the modem 152, the display controller 153, the memory 154, the external memory controller 155, the transaction unit 157, the PMIC 158, and/or the GPU 159. The modem 152 may demodulate a signal received from the outside of the SoC 150, and also, may transmit a signal generated in the SoC 150 to the outside after modulating the signal. The external memory controller 155 may control an operation of transceiving data from an external memory device connected to the SoC 150. For example, a program and/or data stored in an external memory device may be provided to the CPU 156, and also, the GPU 159 under the control of the external memory controller 155. The GPU 159 performs program instructions related to a graphic processing. The GPU 159 may receive graphic data through the external memory controller 155, and also, may transmit graphic data processed by the GPU 159 to the outside of the SoC 150 through the external memory controller 155. The transaction unit 157 may monitor data transaction of each of the functional blocks 152, 153, 154, 155, 158, and/or 159, and the PMIC 158 may control power supplied to each of the functional blocks 152, 153, 154, 155, 157, and/or 159 according to the control of the transaction unit 157. The display controller 153 may transmit data generated inside of the SoC 150 to an external display by controlling the external display (or a display device).

The memory 154 as a non-volatile memory may include a non-volatile memory such as an Electrically Erasable Programmable Read-Only Memory (EEPROM), a flash memory), a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), a Ferroelectric Random Access Memory (FRAM), etc. and as a volatile memory may include a Dynamic Random Access Memory (DRAM), a Static Random Access Memory (SRAM), a mobile DRAM, a Double Data Rate Synchronous Dynamic Random Access Memory (DDR SDRAM), a Low Power DDR (LPDDR) SDRAM, a Graphic DDR (GDDR) SDRAM, a Rambus Dynamic Random Access Memory (RDRAM), etc.

Figure 16:
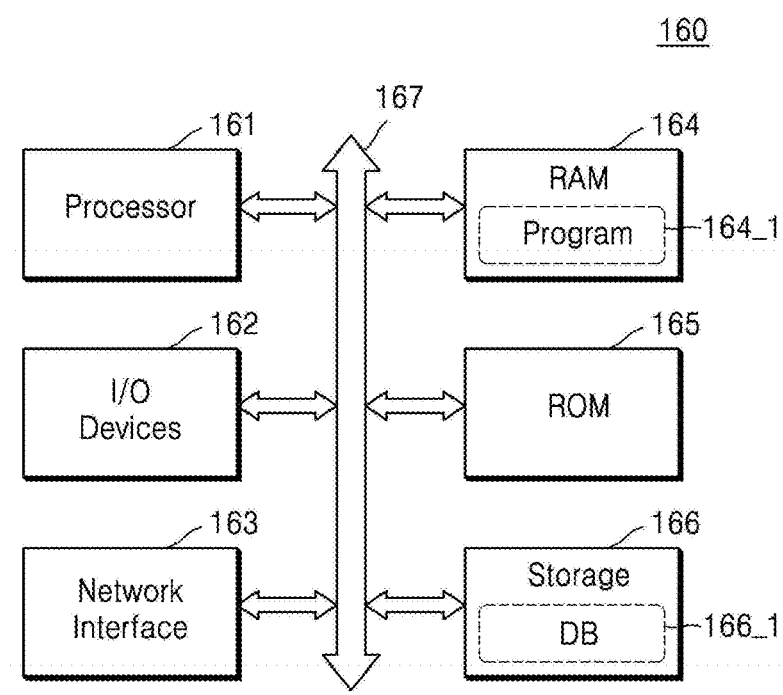
FIG. 16 is a block diagram of a computing system including a memory that stores a program according to an example embodiment of the inventive concepts.

FIG. 16 is a block diagram of a computing system 160 including a memory that stores a program according to an example embodiment of the inventive concepts. At least some of operations included in the method (for example, the method of FIG. 4) of manufacturing an integrated circuit, the method (for example, the operation S40' of FIG. 5) of generating a layout of an integrated circuit, and the method (for example, the method of FIG. 13) of changing a layout of an integrated circuit according to the example embodiments of the inventive concepts may be performed in the computing system 160.

The computing system 160 may be a fixed type computing system, such as a desktop computer, a workstation, or a server, and also, may be a mobile type computing system, such as a laptop computer. As depicted in FIG. 16, the computing system 160 may include a processor 161, input/output devices 162, a network interface 163, a random access memory (RAM) 164, a read only memory (ROM) 165, and/or a storage 166. The processor 161, the input/output devices 162, the network interface 163, the RAM 164, the ROM 165, and/or the storage 166 may be connected to a bus 167, and may communicate with each other through the bus 167.

The processor 161 may be referred to as a processing unit, and may include at least one core that may execute an arbitrary instruction set (for example, IA-32 (Intel Architecture-32), 64 bit extension IA-32, x86-64, PowerPC, Sparc, MIPS, ARM, IA-64, etc.) like a micro-processor, an application processor (AP), a digital signal processor (DSP), or graphic processing unit. For example, the processor 161 may access a memory, that is, the RAM 164 or the ROM 165 through the bus 167, and may execute instructions stored in the RAM 164 or ROM 165.

The RAM 164 may store a program 164_1 that performs at least some of methods for manufacturing an integrated circuit according to example embodiments of the inventive concepts, and the program 164_1 may make the processor 161 perform at least some of operations included in the method (for example, the method of FIG. 4) of manufacturing an integrated circuit, the method (for example, the operation S40' of FIG. 5) of generating a layout of an integrated circuit, and the method (for example, the method of FIG. 13) of changing a layout of an integrated circuit. The program 164_1 may include a plurality of instructions executable by the processor 161, and the instructions included in the program 164_1 may make the processor 161 perform at least some portions of the operations included, for example, in the flowcharts described above.

The storage 166 may keep stored data even though power to the computing system 160 is blocked. For example, the storage 166 may include a non-volatile memory, or a storage medium, such as a magnetic tape, an optical disc, and a magnetic disc. Also, the storage 166 may be attachable to and detachable from the computing system 160. The storage 166 may store a program 164_1 according to an example embodiment, and before the program 164_1 is executed by the processor 161, the program 164_1 or at least some of the program 164_1 may be loaded to the RAM 164 from the storage 166. Alternatively, the storage 166 may store a file written in a program language, and the program 164_1 generated by a compiler or at least some of the program 164_1 may be loaded to the RAM 164 from the file. Also, as depicted in FIG. 16, the storage 166 may store a database 166_1, and the database 166_1 may include information, for example, the cell library D12 of FIG. 4 required for designing an integrated circuit.

The storage 166 may store data to be processed by the processor 161 or data processed by the processor 161. That is, the processor 161 may generate data by processing data stored in the storage 166 according to the program 164_1 or may store the generated data in the storage 166. For example, the storage 166 may store the RTL data D11 of FIG. 4, the netlist data D13, and/or the layout data D14.

The input/output devices 162 may include an input device, such as a key board and pointing device, etc. and also, may include an output device, such as a display device and a printer, etc. For example, a user may trig an execution of the program 164_1 by the processor 161 through the input/output devices 162, may input the RTL data D11 and/or the netlist data D13 of FIG. 4, and may confirm the layout data D14 of FIG. 4.

The network interface 163 may provide an access to a network outside of the computing system 160. For example, the network may include a plurality of computing systems and communicating links, and the communicating links may include wire links, optical links, wireless links, or other arbitrary type links.

As described above, example embodiments of the inventive concepts have been disclosed in the drawings and specification. In the present specification, the example embodiments are described by using some specific terms, but the terms used are for the purpose of describing technical scope of the inventive concepts only and are not intended to be limiting of meanings or the technical scope described in the claim. Therefore, it will be understood by those skilled in the art that various changes in form and details may be made therein without departing from the spirit and scope of the inventive concepts as defined by the appended claims. Accordingly, the scope of the inventive concepts is defined not by the detailed description of the inventive concepts but by the appended claims.

What is claimed is:

1. An integrated circuit comprising:
    a plurality of gate lines extending in a first horizontal direction;
    a first active region and a second active region each overlapping with at least one of the plurality of gate lines vertically and extending in a second horizontal direction that crosses the first horizontal direction;
    a first power rail and a second power rail extending in the second horizontal direction;
    a first power tap electrically connected to the first power rail and comprising a first outer portion and a first inner portion which extend in the second horizontal direction; and a second power tap electrically connected to the second power rail and comprising a second outer portion and a second inner portion which extend in the second horizontal direction,
wherein the first outer portion at least partially overlaps the first active region vertically.

2. The integrated circuit of claim 1, wherein
the first outer portion is longer in the second horizontal direction and nearer to the first power rail than the first inner portion, and
the second outer portion is longer in the second horizontal direction and nearer to the second power rail than the second inner portion.

3. The integrated circuit of claim 1, wherein
the first active region comprises at least one fin extending in the second horizontal direction, and
the second active region comprises at least one fin extending in the second horizontal direction.

4. The integrated circuit of claim 1, further comprising:
at least one input pin and at least one output pin of standard cells,
wherein the at least one input pin, the at least one output pin, the first power tap and the second power tap are formed in a first conductive layer.

5. The integrated circuit of claim 1, further comprising:
at least one first via disposed on the first outer portion and connecting the first power tap to the first power rail; and
at least one second via disposed on the second outer portion and connecting the second power tap to the second power rail.

6. The integrated circuit of claim 1, wherein
the second outer portion at least partially overlaps with the second active region vertically.

7. The integrated circuit of claim 1, wherein
the first active region and the second active region extend in the second horizontal direction in a first row of standard cells,
the first power tap and the second power tap are disposed in the first row, and
the first power rail and the second power rail extend in the second horizontal direction along first and second boundaries of the first row, respectively.

8. The integrated circuit of claim 7, wherein
the first power tap is spaced apart from the first boundary of the first row with a first space,
the second power tap is spaced apart from the second boundary of the first row with the first space, and
the first space is in a range from 40 nm to 60 nm.

9. The integrated circuit of claim 7, further comprising:
a third power tap disposed in a second row of standard cells and electrically connected to the first power rail, the second row interfacing with the first boundary of the first row,
wherein the first power tap and the third power tap are formed in a same conductive layer and spaced apart each other from the first boundary of the first row with a minimum space of the conductive layer.

10. The integrated circuit of claim 1, further comprising:
a third power tap adjacent to the first power tap in the first horizontal direction and electrically connected to the first power rail,
wherein the third power tap comprises a third outer portion and a third inner portion extending in the second horizontal direction, and
a pitch between the first outer portion and the third outer portion is less than a pitch provided by single-patterning.

11. The integrated circuit of claim 1, further comprising:
a third power tap adjacent to the first power tap in the first horizontal direction and electrically connected to the first power rail, the third power tap comprising a third outer portion and a third inner portion which extends in the second horizontal direction,
a first via disposed on the first outer portion and connecting the first power tap to the first power rail, and
a second via disposed on the third outer portion and connecting the third power tap to the first power rail,
wherein a pitch between the first via and the second via is greater than a pitch between the first outer portion and the third outer portion.

12. An integrated circuit comprising:
a plurality of gate lines extending in a first horizontal direction;
a first active region and a second active region each overlapping with at least one of the plurality of gate lines vertically and extending in a second horizontal direction that crosses the first horizontal direction;
a first power rail and a second power rail extending in the second horizontal direction;
a first power tap electrically connected to the first power rail and comprising a first outer portion and a first inner portion which extend in the second horizontal direction; and
a second power tap electrically connected to the second power rail and comprising a second outer portion and a second inner portion which extend in the second horizontal direction,
wherein the first inner portion has different lengths in the first horizontal direction and the second horizontal direction, and
the first outer portion at least partially overlaps the first active region vertically.

13. The integrated circuit of claim 12, wherein
the first inner portion overlaps with the first active region vertically, and
the second inner portion overlaps with the second active region vertically.

14. The integrated circuit of claim 12, further comprising:
at least one first via disposed on the first outer portion and connecting the first power tap to the first power rail; and
at least one second via disposed on the second outer portion and connecting the second power tap to the second power rail.

15. An integrated circuit comprising:
a first standard cell disposed in a first row and comprising a first power tap to which a first supply voltage is applied through a first via; and
a second standard cell disposed in a second row which is adjacent to the first row and comprising a second power tap to which the first voltage is applied through a second via,
wherein a space between the first power tap and the second power tap is less than a space provided by single-patterning,
the first via is disposed on a first outer portion of the first power tap,
the second via is disposed on a second outer portion of the second power tap, and
a pitch between the first via and the second via is greater than a pitch between the first outer portion and the second outer portion.

16. The integrated circuit of claim 15, further comprising:
a power rail extending along a boundary between the first row and the second row, wherein the first power tap and the second power tap are electrically connected to the power rail.

17. The integrated circuit of claim 15, further comprising:
a third standard cell disposed in a third row which is adjacent to the second row and comprising a third power tap to which a second supply voltage is applied,
wherein the second standard cell further comprises a fourth power tap to which the second supply voltage is applied, and
a space between the third power tap and the fourth power tap is less than the space provided by single-patterning.

18. The integrated circuit of claim 17, wherein
the first power tap and the third power tap are included in a first group of patterns which are formed simultaneously, and
the second power tap and the fourth power tap are included in a second group of patterns which are formed simultaneously.

19. The integrated circuit of claim 17, wherein
the first power tap and the fourth power tap are included in a first group of patterns which are formed simultaneously, and
the second power tap and the third power tap are included in a second group of patterns which are formed simultaneously.

20. The integrated circuit of claim 15, wherein at least one of the first standard cell and the second standard cell is an AOI cell.

\* \* \* \* \*